United States Patent
Pokkunuri et al.

(10) Patent No.: US 12,131,394 B1
(45) Date of Patent: Oct. 29, 2024

(54) DISTRIBUTED SYSTEM FOR AUTOMATED RESTAURANT ORDER ACQUISITION

(71) Applicant: Amazon Technologies, Inc., Seattle, WA (US)

(72) Inventors: Rama Krishna Sandeep Pokkunuri, Redmond, WA (US); Roger Scott Jenke, Seattle, WA (US); Harshal Pimpalkhute, Redmond, WA (US); Yahor Pushkin, Redmond, WA (US); Swapandeep Singh, Sammamish, WA (US); Vasanth Philomin, Seattle, WA (US); Ganesh Kumar Gella, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 99 days.

(21) Appl. No.: 17/219,640

(22) Filed: Mar. 31, 2021

(51) Int. Cl.
  *G06Q 50/12* (2012.01)
  *G06N 20/00* (2019.01)

(52) U.S. Cl.
  CPC ............ *G06Q 50/12* (2013.01); *G06N 20/00* (2019.01)

(58) Field of Classification Search
  CPC ............................. G06Q 50/12; G06N 20/00
  See application file for complete search history.

(56) References Cited

U.S. PATENT DOCUMENTS

| | | |
|---|---|---|
| 6,246,981 B1 | 6/2001 | Papineni et al. |
| 6,415,257 B1 | 7/2002 | Junqua et al. |
| 6,510,411 B1 | 1/2003 | Norton et al. |
| 7,197,460 B1 | 3/2007 | Gupta et al. |
| 9,928,833 B2 | 3/2018 | Prokhorov |
| 9,934,777 B1 | 4/2018 | Joseph et al. |
| 10,331,791 B2 | 6/2019 | Vikram et al. |
| 10,453,117 B1 | 10/2019 | Reavely et al. |
| 10,891,152 B2 | 1/2021 | Anbazhagan et al. |
| 11,004,449 B2 | 5/2021 | Bender |
| 11,023,959 B2 | 6/2021 | Kalaimani |

(Continued)

FOREIGN PATENT DOCUMENTS

| | | |
|---|---|---|
| EP | 2933070 | 10/2015 |
| WO | 9723088 | 6/1997 |
| WO | 2008054331 | 5/2008 |

OTHER PUBLICATIONS

No Author, "Natural Language Processing (NLP): A Complete Introduction" MonkeyLearn Aug. 12, 2020, Retrieved from https://monkeylearn.com/natural-language-processing/, 2020, pp. 1-41.

(Continued)

*Primary Examiner* — Michael Jared Walker
*Assistant Examiner* — Reva R Moore
(74) *Attorney, Agent, or Firm* — Robert C. Kowert; Kowert, Hood, Munyon, Rankin & Goetzel, P.C.

(57) ABSTRACT

Using a first set of machine learning models, a communication from a user of a restaurant is analyzed at an order coordinator linked via a network to resources of an order management service at a provider network. A response to the communication is prepared using another set of models at the provider network and presented to the user. An order of the user for one or more restaurant menu items is fulfilled, based at least partly on analysis of a second communication received from the user after the response is presented.

20 Claims, 20 Drawing Sheets

(56) References Cited

U.S. PATENT DOCUMENTS

| | | | |
|---|---|---|---|
| 11,354,760 | B1 | 6/2022 | Dorch |
| 11,355,122 | B1 | 6/2022 | Gonzalez |
| 11,574,345 | B2 | 2/2023 | Dorch |
| 11,704,753 | B2 | 7/2023 | Dorch |
| 11,710,481 | B2 | 7/2023 | Ham |
| 2007/0143099 | A1 | 6/2007 | Balchandran et al. |
| 2008/0010280 | A1 | 1/2008 | Jan et al. |
| 2010/0298012 | A1 | 11/2010 | Damarla |
| 2015/0263941 | A1 | 9/2015 | Jung |
| 2016/0042748 | A1 | 2/2016 | Jain et al. |
| 2016/0225370 | A1 | 8/2016 | Kannan et al. |
| 2017/0116982 | A1 | 4/2017 | Gelfenbeyn et al. |
| 2017/0125008 | A1 | 5/2017 | Maisonnier et al. |
| 2017/0193387 | A1 | 7/2017 | Lavallee |
| 2017/0236512 | A1 | 8/2017 | Williams |
| 2017/0286916 | A1 | 10/2017 | Skiba et al. |
| 2018/0143857 | A1* | 5/2018 | Anbazhagan ............ G06F 40/35 |
| 2020/0065881 | A1* | 2/2020 | Truong .................. G06V 20/62 |
| 2020/0226667 | A1* | 7/2020 | Kalaimani ............ G10L 15/183 |
| 2020/0312298 | A1* | 10/2020 | Bui .......................... G06F 3/167 |
| 2022/0270600 | A1 | 8/2022 | Aggarwal |

OTHER PUBLICATIONS

U.S. Appl. No. 17/219,630, filed Mar. 31, 2021, Pushkin, et al., Amazon Technologies, Inc., pp. 1-79, drawing pp. 1-20.

Chan Hee Song, Dawn Lawrie, Tim Finin, James Mayfield, "Gazetteer Generation for Neural Named Entity Recognition," Copyright 2020, Association for the Advancement of Artificial Intelligence (www.aaai.org). All rights reserved, in Proceedings of the 33rd International FLAIRS Conference (2020); May 17, 2020, pp. 1-4.

Kenton Lee, Luheng He, Mike Lewis, and Luke Zettlemoyer, "End-to-end Neural Coreference Resolution," Facebook AI Research, arXiv:1707.07045v2 [cs.CL] Dec. 15, 2017, pp. 1-10.

Tom Kocmi and Ondrej Bojar, "An Exploration of Word Embedding Initialization in Deep-Learning Tasks," preprint: arXiv:1711.09160v1 [cs.CL] Nov. 24, 2017, in Proceedings of the 14th International Conference on Natural Language Processing, Dec. 2017, pp. 1-9.

Miguel Ballesteros, et al. (Amazon AI), "Severing the Edge Between Before and After: Neural Architectures for Temporal Ordering of Events," arXiv:2004.04295v1 [cs.CL] Apr. 8, 2020, pp. 1-6.

Robert Jamison, "Announcing a New Tool for Building Interactive Adventure Games on Alexa", Amazon Mobile App Distribution Blog, Retrieved from URL: https://developer.amazon.com/public/community/post/TxEQV5K754YS77/Announcing-a-New-Tool-for-Building-Interactive-Adventure-Games-on-Alexa on Oct. 30, 2016, pp. 1-11.

"Getting Started with the Alexa Skills Kit", Amazon Apps & Games Developer Portal, Retrieved from URL: https://developer.amazon.com/pulbic/solutions/slexas/alexa-skills-kit/getting-started-guide on Oct. 30, 2016, pp. 1-7.

Seth Rosenberg, "How to Build Bots for Messenger", Facebook for Developers, Retrieved from URL: https://developers.facebook.com/blog/post/2016/04/12/bots-for-messenger on Oct. 30, 2016, pp. 1-5.

Ali El-Kahky, et al., "Entending Domain Coverage of Language Understanding Systems via Intent Transfer Between Domains Using Knowledge Graphs and Search Query Click Logs", 2014 IEEE International Conference on Acoustic, Speech and Signal Processing (ICASSP), pp. 4087-4091.

Elad Natanson, "Messaging Platforms, Bots and The Future of Mobile", Retrieved from URL: http://www.forbes.com/sites/eladnatanson/2016/04/08/messaging-platforms-bot-and-the-future-of-mobile/#2d1ab79884af on Oct. 30, 2016. pp. 1-7.

"Messenger Platform", Facebook for Developers, Retrieved from URL: https://developers.facebook.com/doc/messenger-platform on Oct. 30, 2016, pp. 1-3.

Collen Estrada, "Microsoft Bot Framework", Mar. 30, 2016, Retrieved from URL: https://blog.botframework.com/2016/03/30/BotFramework/ on Oct. 30, 2016, pp. 1-7.

"Microsoft Cognitive Services—APIs", Retrieved from URL: https://www.microsoft.com/cognitive-services/en-us/apis on Oct. 30, 2016, pp. 1-8.

Himanshu S. Bhatt, et al., "Cross-domain Text Classification with Multiple Domains and Disparate Label Sets", Proceedings of the 54th Annual Meeting of the Association for Computational Linguistics, Aug. 7-12, 2016, pp. 1641-1650.

Amit Fulay, "Say hello to Google Allo: a smarter messaging app", Retrieved from URL: https://blog.google/products/allo/google-allo-smater-messaging-app on Oct. 30, 2016, pp. 1-14.

"Training for the Alexa Skills Kit", Amazon Apps & Games Developer Portal, Retrieved from URL: https://developer.amazon.com/public/solutions/alexa/alexa-skills-kits/content/alexa-skilss-developer-training on Oct. 30, 2016, pp. 1-4.

Wikipedia, "Vorbis", Retrieved from URL: https://en.wikipedia.org/wiki/Vorbis on Sep. 26, 2016, pp. 1-10.

International Search Report and Written Opinion from PCT/US17/063066, dated Nov. 22, 2017, Amazon Technologies Inc., pp. 1-14.

Svetlana Stoyanchev et al "Rapid Prototyping of Form-driven Dialogue Systems Using an Open-Source Framework", Proceddings of the Sigdial 2016 Conference, pp. 216-219.

Claus Brabrand "PowerForms: Declarative client-side form field validation" Brics Report Series, Jan. 1, 2000, pp. 205-214.

U.S. Appl. No. 17/030,204, filed Sep. 23, 2020, Saab Mansour, all pages.

U.S. Appl. No. 15/841,122, filed Dec. 13, 2017, Rashmi Gangadhariah, all pages.

U.S. Appl. No. 17/039,889, filed Sep. 30, 2020 Singh, et al., all pages.

U.S. Appl. No. 17/039,900, filed Sep. 30, 2020, Swapandeep Singh et al.

U.S. Appl. No. 17/039,920, filed Sep. 30, 2020, Jin Hoon Bang et al.

* cited by examiner

DISTRIBUTED SYSTEM FOR AUTOMATED RESTAURANT ORDER ACQUISITION

BACKGROUND

In recent years, the number of small-footprint sensor-containing devices such as smart phones, wearable devices, personal assistant devices and various other "Internet of Things" (IoT) devices which can be used for accessing a variety of remote applications have been increasing dramatically. Many of these devices comprise sensors capable of detecting voiced commands; in some cases, sensors for detecting signals of other modalities such as dual tone multi frequency (DTMF) signals, text and the like may also be incorporated in these devices. The small-footprint devices are often designed to communicate with server farms of various types of services which can be used to perform application tasks based on the input provided via the devices.

In principle, the proliferation of devices that can collect voice signals (as well as signals of other modalities) increases the number of channels that can be used by vendors to provide various services and applications, thereby potentially increasing revenues for their businesses. Many customers may find it much more appealing or intuitive to, for example, order a meal using voiced commands than to order the meal after filling out a form on a computer screen. Customers may typically prefer to use conversational or "natural" language to express their commands or intentions, in a manner similar to the way they would interact with other individuals, rather than being restricted to using specific "canned" phrases in a certain sequence. Applications which are designed to interact conversationally with customers may be referred to as dialog-driven applications.

The interpretation of the signals received via the sensor-containing devices is a complex problem, especially in scenarios in which customers are allowed to express themselves informally or conversationally. In many cases, in order to fulfill a particular task being requested by a customer, it may not be sufficient to interpret just one set of voiced words; instead, a back-and-forth interaction may be needed to determine various aspects of the customer requirements or orders. Different customers may have different behaviors regarding their interactions with a given dialog-driven application or service. In some cases, for example, a given customer may wish to use multiple modes of communication (e.g., voice and text) for different parts of a single order request, or modify a requirement indicated in an earlier portion of the conversation without repeating the entire request. Managing interactions between a dialog-driven application or service and diverse clients remains a non-trivial technical challenge.

Figure 1:
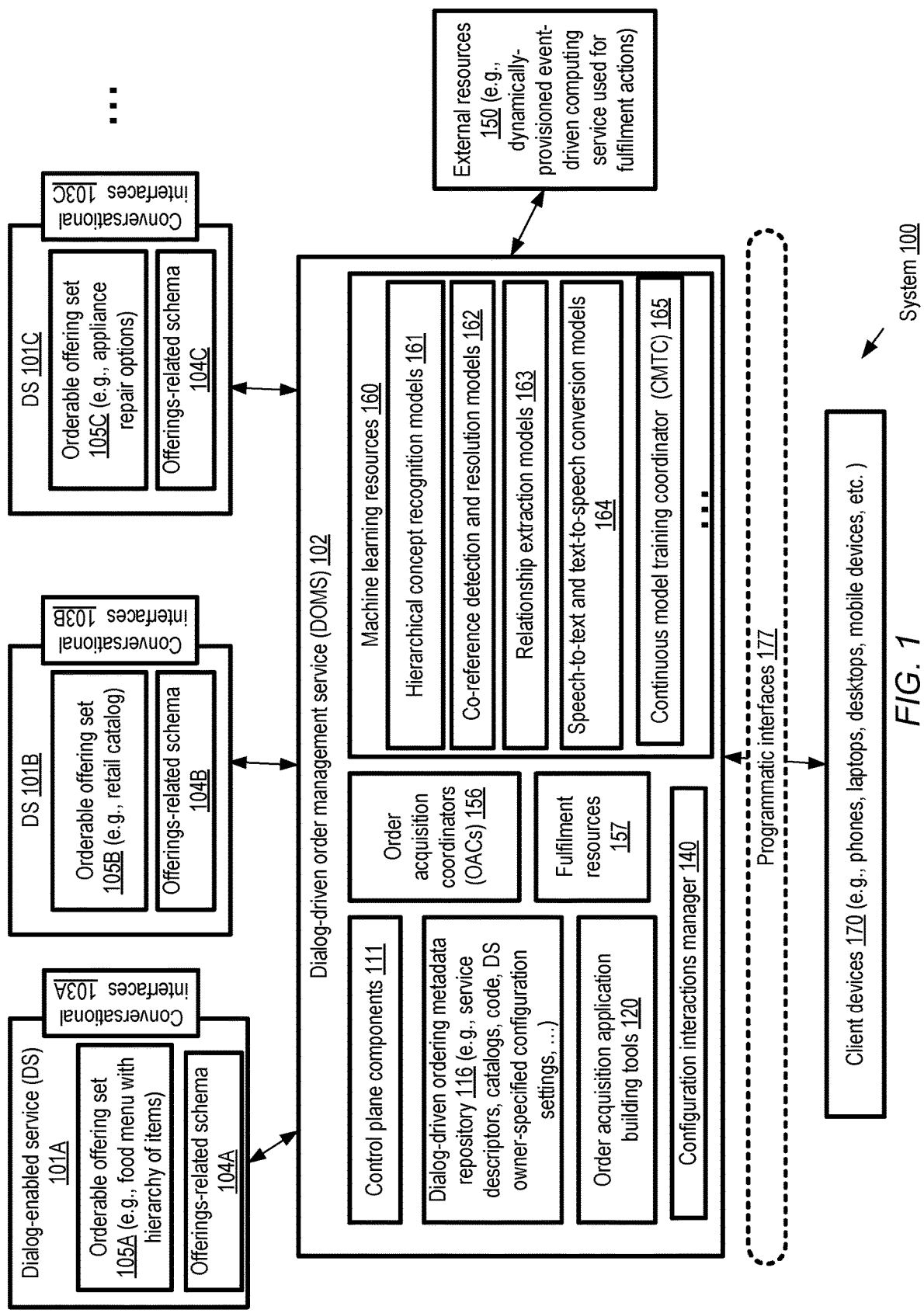
FIG. 1 illustrates an example system environment in which a dialog-driven order management service which utilizes machine learning models for recognition and relationship extraction of several categories of ordering-related concepts may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for aspects of dialog-driven order acquisition and fulfilment for services and applications which enable their end users to specify and customize orders directed to a variety of offerings, including but not limited to food items, retail items, appointments for in-person or remote care, and the like using informal conversational interactions. The term "order acquisition", also referred to as "order composition", refers herein to the set of operations performed to populate the fields or attributes of an order expressed via such conversational interactions; "order fulfilment" refers to the operations performed to provide the ordered offerings to the end user after the order has been acquired or composed. The conversational interactions may be conducted by the end users using any desired combination of various communication channels or modes, including channels for voice, text, dual-tone-multi-frequency (DTMF) signals, touch, bodily gestures and the like. End-user-provided input via such channels may be analyzed using a variety of novel machine learning-based techniques, including the recognition of order-related concepts that are not limited to entities of a catalog or menu but provide auxiliary information that can potentially be used to determine various properties of an order. Machine learning techniques may be employed to prepare responses or prompts for end users during a multi-utterance conversation. Machine learning models may also be utilized for co-reference group detection and resolution among instances of the recognized concepts, as well as for detecting relationships among such instances which can then be used to accurately fill out the fields of orders. Individual offerings may be combined hierarchically in some cases, e.g., an offering O1 (which may or may not necessarily be orderable on its own) may be added on to a parent offering O2 in a particular user's order, another offering O3 may be added on to O1, and so on.

The disclosed techniques for order acquisition and fulfilment, which may also be referred to collectively as order processing, may be implemented at least in part at a provider network or cloud computing environment in various embodiments. In at least some embodiments, a distributed order processing service which comprises resources located at premises external to a provider network, such as at restaurants, food trucks, retail stores, kiosks, as well as provider network resources may be used for order processing. For example, in some embodiments, a network of devices at one or more restaurant premises may be linked to resources of a provider network-based dialog-driven automated restaurant order management service, and software provided by the restaurant order management service may be run at the restaurant premise network to coordinate at least some aspects of order processing in collaboration with back-end resources at the provider network's data centers. The enhanced machine learning techniques described herein, and the distributed approach for processing restaurant-specific orders (or orders in other application domains) may simplify the acquisition of orders for various types of organizations, while avoiding imposing the types of strong constraints on user-provided input that tend to make some traditional voice-driven interactions tedious or unpleasant for end users.

As one skilled in the art will appreciate in light of this disclosure, certain embodiments may be capable of achieving various advantages, including some or all of the following: (a) enabling the customization of various aspects of ordering-related end user interactions with a wide variety of dialog-driven applications and services with a minimum of effort on the part of application or service owners, (b) reducing the overall amount of network, computing, and/or storage resources which have to be used for supporting large numbers of orders from end users of dialog-driven applications, e.g., by more accurately and quickly recognizing various attributes of customer orders, without requiring the end users to follow stringent rules for specifying the order attributes, (c) reducing the number of network, computing, and/or storage resources which may be consumed for returning or canceling orders which have been incorrectly interpreted, and/or (d) enabling relatively small organizations, such as food trucks or shopping kiosks, to increase the rate at which orders for their catalog or menu items can be processed accurately, without having to deploy substantial computing resources locally.

As used herein, the term "dialog-driven service" refers to a service in which, in order to complete a particular task or function, respective values of one or more parameters may be obtainable from analysis of input provided by an end user of the service via one or more modes/formats of conversational interactions, such as audio (voice), text, dual tone multi-frequency (DTMF) signals, video, gestures, or combinations of such modes/formats. A given interaction may in turn comprise one or more end user "utterances" (logically-grouped related user input provided via some combination of audio, text, DTMF, touch signals, or the like, for which a coherent response can be generated after the logically-grouped related user input is analyzed/processed). A given utterance may be multi-modal in at least some embodiments, e.g., an end user may begin providing input via voice and complete the utterance using text or DTMF signals. In some embodiments, bi-directional streaming channels may be employed for the communication between an end user and a dialog-driven service, in which one or both of the parties (the end user or the service) participating in a conversational interaction can interrupt an ongoing utterance of the other party. The terms "dialog-driven application" and "dialog-driven service" may be used interchangeably herein.

According to some embodiments, a system may comprise one or more computing devices. The computing devices may include instructions that upon execution on or across the computing devices cause the computing devices to obtain a representation of one or more utterances of a user of a dialog-driven service which has a catalog or menu comprising a plurality of offerings. At least some offerings of the dialog-driven service may be organized in a hierarchy in some embodiments. For example, some items of the catalog or menu may be added on to others if desired by a user within a given order, default child offerings of a parent offering (e.g., cheese on a particular food item which is typically served with cheese) may be removed if desired. Multiple levels of such hierarchical relationships may exist for some combinations of offerings in some scenarios, e.g., item B may be added on to item A, item C may be added on to item B, default item D which is ordinarily part of item C may be removed from item C, etc.

From the one or more utterances whose representation is received, a first group of concepts may be identified in various embodiments at the computing devices using a set of one or more machine learning models. In at least some embodiments, the first group of concepts may include a primary or concrete concept representing an offering which is included in the catalog of the service, as well as a secondary or auxiliary concept which (a) does not directly represent or correspond to an offering included in the catalog and (b) provides additional information about the offering represented by the primary or concrete concept. In some cases, the auxiliary concept may for example comprise a handle or token (e.g., a pronoun) which refers to an offering represented by the primary concept, or a token which describes one or more properties of the offering. The additional information may potentially be used to populate one or more parameters of a service order for the offering in various embodiments. Secondary or auxiliary concepts may also be referred to as non-primary concepts.

A graph comprising a plurality of nodes and a plurality of edges may be constructed at the computing devices in various embodiments. Individual nodes of the plurality of nodes may represent respective concepts of a reduced collection of concepts obtained from the first group of concepts using co-reference analysis in some embodiments. An edge of the plurality of edges may represent a hierarchical relationship inferred, using the set of one or more machine learning models, between a pair of concepts which are linked by the edge in the graph in such embodiments. The co-reference analysis may also be performed using the one or more machine learning models in different embodiments.

Based at least on the graph, one or more parameters of a service order for a plurality of offerings of the service may be populated in various embodiments. In at least some cases, such a plurality of offerings may include a pair of offerings which belong to a hierarchy—e.g., one of the offerings of the pair may be a child offering or add-on of the other offering of the pair. A representation of the service order may be transmitted to one or more order fulfillment resources (e.g., software programs that collectively cause the offerings to be packaged together and provided to the end user or customer, along with an indication of a bill or cost) in various embodiments.

The number of distinct machine learning models used for hierarchical concept recognition, co-reference analysis/resolution, inter-concept relationship extraction/analysis, and other tasks associated with order acquisition and fulfilment may differ in different implementations. For example, in one implementation, separate models may be employed for concept recognition, co-reference analysis and relationship extraction; in other implementations, a single large model may be used for all these types of tasks, or a single model may be used for a pair of tasks, and so on. In some embodiments, at least some operations for concept recognition, co-reference analysis or relationship analysis may be conducted concurrently or in parallel. For example, a co-reference group comprising one concept C1 mentioned in an utterance U1 and a concept C2 in a previous utterance U2 may be identified before all the concepts of U1 have been recognized or detected, a hierarchical relationship between two concepts C1 and C3 of U1 may be determined before all the co-references of concepts within U1 have been identified, and so on.

In some embodiments, the machine learning techniques for order acquisition may be implemented at least in part using resources of a dialog-driven order management service (DOMS) of a provider network or cloud-based computing environment. In some embodiments a DOMS may be used at least in part to host or implement "bot" or "chatbot" functionality, for example for handling customer support operations of an organization, and may thus be referred to as a "bot" or "chat bot" service or framework. A DOMS may also be referred to as a dialog flow handling service in some embodiments. As discussed in further detail below, in at least some embodiments, resources external to the data centers of the provider network (such as order coordination programs installed and run at devices at a restaurant premise or a retail premise) may also be used for order acquisition and fulfilment.

In one embodiment, a baseline set of machine learning models for concept recognition, co-reference analysis and/or relationship analysis for a given problem domain may be trained at least partly at a DOMS. Such baseline models may subsequently be customized for individual DOMS clients (e.g., restaurant owners, retail store owners and the like) based on input provided by the clients. In the restaurant order processing problem domain, for example, the baseline models may be trained to detect properties of orders for common food items in the country where they are being utilized, such as (in some countries) sandwiches, pasta and the like, while the custom versions of the models may be trained to detect properties of orders for specific items of a particular restaurant or group of restaurants specializing in a particular type of cuisine. A client may provide a representation of their service's catalog or menu to the DOMS, and the DOMS may re-train the baseline set of models to obtain a set of models which is customized for that particular catalog or menu. As and when updates to the menu (e.g., indicating the addition or removal of specific items from the menu or catalog) are provided to the DOMS by the client, new training examples may be synthesized automatically at the DOMS to continuously re-train the models, keeping the models relevant and up-to-date for the client. Such synthesized training examples (e.g., comprising utterances representing various aspects of orders which might be received in the future, or combinations of portions of such utterances collected in the past) may be employed to train the baseline models as well in at least some embodiments. A variety of different types of models and machine learning algorithms may be employed in different embodiments to accomplish the set of tasks involved in order processing. Such models may include, for example, (a) a hierarchical encoder-decoder, (b) a convolutional neural network layer, (c) a recurrent neural network layer, (d) a transformer, and/or (e) a model in which one or more gazetteer bits are added to a token of an utterance prior to generating an embedding representing the token (with the gazetteer bits selected based at least in part on contents of the catalog or menu of the service for which order processing is being performed), and so on.

In addition to recognizing primary concepts which represent respective entities of the catalog, a variety of auxiliary or secondary concepts may also be recognized by the DOMS in various embodiments using machine learning models. For example, an auxiliary concept may represent (a) a negation of an offering corresponding to a primary concept (e.g., "no" in the phrase "no cheese"), (b) a quantifier of an offering (e.g., "five" in the phrase "five slices of pizza"), (c) a size indicator of an offering (e.g., "large" in the phrase "large coffee", (d) an override of one or more default attributes of an offering (e.g., "whole wheat" instead of the default "flour" attribute of a menu item), and/or (e) a qualitative attribute of an offering (e.g., "well-done" for an ordered item which can be cooked to different levels).

Based in some cases on such auxiliary concepts which have been recognized along with primary concepts, a number of relationships may be detected among the concepts using the machine learning models in various embodiments. Such relationships may include, for example, (a) a quantity of an offering represented by a particular concept, (b) a size of an offering represented by a particular concept, (c) a negation of a property of an offering represented by a particular concept, and/or (d) an indication that an offering represented by the other concept is to be added on to an offering represented by a particular concept.

In various embodiments, as suggested above, the machine learning models used at the DOMS may process contents of more than one utterance of a given conversation at a time. For example, in one conversation, an end user utterance U1 may result in the preparation and composition of a response utterance R1 by the DOMS, which in turn is followed by a second user utterance U2. Relationships and/or co-references may be identified among concepts C1, C2 and C3 (mentioned in U1) and concepts C4 and C5 (mentioned in U2) by the models in such a scenario. Any of a variety of co-reference group categories may be detected among concepts in one or more utterances using the machine learning models in different embodiments, such as groups of co-references comprising pronouns that refer to other concepts (which may be referred to as pronomial or pronoun-based co-references), an ordinal term (e.g., first, second, last, etc.) and an offering or concept to which the ordinal term refers, multiple references to an offering using repeated terms, references to different instances of an offering (e.g., two different uses of the word "lemonade" in a conversation, referring to two different drinks), and so on.

As mentioned earlier, distributed systems utilizing a combination of provider network resources and external resources may be implemented for order processing tailored to specific problem domains, such as restaurant order management, may be implemented in some scenarios. According to some embodiments, a system may comprise one or more computing devices. The computing devices may include instructions that upon execution on or across the computing devices cause the computing devices to obtain an indication, via a programmatic interface at an automated restaurant order management service (AROMS) implemented at least in part at a provider network, of a particular restaurant for which order acquisition is to be automated. Such an AROMS may represent one example of a problem-domain-specific extension of a DOMS of the kind introduced above. An indication of the restaurant premise may be provided, for example, in a programmatic restaurant registration request in some embodiments. In response to such a registration request, in at least some embodiments, software to be installed locally at the restaurant premise, such as one or more software programs collectively implementing an on-premise order coordinator, may be provided by or transmitted from the AROMS. In at least some embodiments, connectivity among a collection of on-premise devices collectively usable for order acquisition, such as speakers (e.g., in a drive-through area or lane of the restaurant premise), microphones, touch screens, cameras, vehicle detection devices, escalation interface devices such as pagers or alarms that can be used to request in-person interactions with a customer, as well as general purpose computing devices located at the restaurant premise, may be established or verified to complete the restaurant registration workflow.

A policy for distributing a various categories of machine learning tasks pertaining to restaurant orders among (a) an on-premise order coordinator executed at the restaurant and (b) the order management service may be determined in various embodiments. The categories of machine learning tasks may include, among others, user utterance detection, user intent identification (identifying what tasks a user or customer of the restaurant wants performed in response to one or more utterances) and order parameter population or order acquisition. In effect such a policy may indicate the extent to which machine learning tasks needed for order processing are to be performed locally at the restaurant versus at the provider network. In some cases, based for example on the needs of the restaurant owner or the computing and networking capabilities of the devices available at the restaurant, a static machine learning workload distribution policy may be used, in which the subset of tasks to be performed locally at the restaurant does not change from one customer interaction to another. In other cases, a dynamic policy may be selected for a customer, in which for example decisions as to which types of machine learning tasks are performed at the restaurant are made in real time, with potentially different distributions of tasks from one customer to another, from one time of day (e.g., peak business hours vs. off-peak business hours) to another, from one mode of communication (e.g., voice vs. text) and so on. In least some embodiments, performance metrics such as network latencies for messages transmitted between the restaurant and the provider network, resource utilization levels at the on-premise computing devices, and so on may be used to dynamically and conditionally distribute machine learning tasks based on the policy.

In some embodiments, a workload distribution policy may comprise one or more rules provided via programmatic interfaces by a client of the AROMS, with the workload distribution rules indicating the particular resources which are preferably to be used to perform one or more machine learning tasks, or the conditions to be used to decode where particular machine learning tasks should be executed. In other embodiments, at least a default rule of a workload distribution policy (indicating for example that concept recognition and co-reference analysis is to be performed by default at the provider network) may be generated by the AROMS, and such a default rule may be overridden by an AROMS client if desired. In one embodiment in which customers of the restaurant may be able to use multiple modes of communication such as voice, text, DTMS and the like, a workload distribution rule of a policy may indicate that the resources to be used to perform a particular machine learning task be selected based at least in part on the communication mode or channel (e.g., more of the processing may be performed at the restaurant for a text-based interaction than a voice-based interaction, as it is often easier to interpret text than voice).

In accordance with a workload distribution policy, in some embodiments, at least a portion of an utterance of a particular user (e.g., a user utilizing a drive-through lane or area of the restaurant) of the restaurant may be analyzed using one or more machine learning models at the on-premise order coordinator. The on-premise order coordinator may transmit, to one or more resources of the order management service at the provider network, at least (a) an indication of a restaurant menu item identified in the analysis of the utterance, and (b) an indication of an a fulfillment capability of the restaurant premise with respect to the restaurant menu item (e.g., whether the restaurant has enough ingredients, raw materials, preparation equipment etc. for the specific menu item identified in the utterance).

The information transmitted by the on-premise order coordinator may be processed using one or more additional machine learning models at the order management service, and a response utterance may be prepared or composed at the order management service. A representation of the response utterance may be transmitted to the on-premise order coordinator, and presented to the particular user via one or more interaction devices (e.g., speakers located near or in a drive-through lane) of the on-premise network. One or more additional utterances of the user, made after the response utterance has been presented, may also be analyzed in some embodiments before the user's order can be fully determined. As such, an informal conversation comprising one or more utterances of the user (potentially interspersed with response utterances or prompts generated automatically at the restaurant premise and/or the AROMS' provider network or back-end resources) may be analyzed using the combination of machine learning models at the restaurant and the back end to populate the fields or parameters of the user's order, e.g., using the kinds of concept recognition, co-reference analysis and relationship extraction techniques introduced above in various embodiments. The order may then be fulfilled at the restaurant premise if the restaurant has the capacity to do so.

If the restaurant does not have the capacity to fulfil the order (e.g., if the restaurant has run out of a particular ingredient), in some embodiments the machine learning models may be used to propose an alternative order (e.g., using one or more substitute ingredients) which may be acceptable to the user. In other embodiments, the user may simply be informed using an automatically generated utterance if the detected order cannot be fulfilled for now. In at least one embodiment, if a portion of an order cannot be fulfilled at the restaurant (e.g., if an important ingredient A of an order is unavailable, in a scenario in which the eventual order may comprise ingredients B, C, D and E as well as A), this may be communicated to the user using utterances prepared at the machine learning models of the on-premise order coordinator (and/or the provider network) as soon as the determination that the portion cannot be fulfilled is made, so as not to waste the time of the user with further interactions.

In at least some embodiments, a customization data set (such as a menu which includes specialty food items prepared at the restaurant) may be provided via programmatic interfaces to the AROMS by the owner/manager of a registered restaurant. Such a customization data set may then be used to train or retrain at least some of the machine learning models to be used for processing orders of the registered restaurant.

In one embodiment, a client of the AROMS, such as the owner/manager of a registered restaurant, may use programmatic interfaces of the AROMS to provide escalation criteria to be used to determine whether an in-person interaction between an employee and a customer of the restaurant is to be initiated after an initial portion of a dialog with the customer has been performed in an automated manner using machine learning models. Such an in-person intervention may be needed, for example, (a) if the customer appears to be dissatisfied, angry or impatient with the automated portion of the conversation (as may be determined using machine learning models for sentiment analysis), (b) if the customer has been presented with the same automated prompt several times but is unable to provide the requested information, (c) if a confidence level assigned for a particular analysis result by a machine learning model used for the conversation with the customer falls below a threshold, or based on various other factors in different embodiments. In at least one embodiment, the AROMS may select one or more escalation criteria for a particular registered restaurant automatically, without requiring clients such as restaurant owners to provide the criteria. If an escalation criterion is met during a particular conversation being conducted with a restaurant customer, a designated employee of the restaurant may be automatically notified that in-person interactions are needed, and the information learned thus far during the conversation may be presented to the employee. In some cases, the employee contacted for the in-person interaction may be present at the restaurant premise, while in other cases a remote employee may be selected and the in-person interaction may be conducted in a phone call or a video session.

According to some embodiments, a client of the AROMS may provide a dialog customization policy to be used for the automated portion of conversations with restaurant customers. In accordance with such a dialog customization policy, an automated utterance (such as a response utterance to one of the customer's utterances) may include an indication of one or more of: (a) a discount offer associated with one or more menu items of the restaurant, (b) information about one or more menu items that has to be provided due to a regulation or official guidelines (e.g., whether a particular ingredient is considered potentially unhealthy for a particular demographic group, calorie counts of various menu items, etc.), (c) a message presented in response to a determination by a machine learning model that one or more of the user's utterances are determined to be anomalous— e.g., if a particular utterance does not appear to make sense in the context of other utterances, or appears to be irrelevant to ordering restaurant items.

A wide variety of machine learning models may be trained and executed using the combination of on-premise and provider network resources in different embodiments. Such models may include, for example, (a) an utterance initiation detection model, (b) an utterance completion detection model, (c) a speech-to-text conversion model, (d) an intent classification model, (e) a sentiment analysis model, (f) an order parameter extraction model, (g) a dialog state management model, (h) a text-to-speech conversion model and/or (i) a concept recognition model which identifies, within user communications, mentions of primary concepts representing restaurant menu items and auxiliary concepts which do not represent restaurant menu items of the restaurant (but are nevertheless usable to populate one or more properties or fields of restaurant orders).

In some embodiments, an AROMS may generate a recommendation for physical placement of one or more interaction devices accessible by users of a registered restaurant—e.g., that a speaker installed in a drive through lane of the restaurant should preferably be moved some distance X away from a microphone located in the drive through lane, or that a touch screen should be moved vertically to make it easier for customers to provide input on orders. Such recommendations may be generated at the AROMS in one embodiment based at least in part on analysis (e.g., acoustic analysis, voice capture quality analysis, etc.) performed using one or more machine learning models.

In one embodiment, at least a portion of the logic of an order coordinator of the kind discussed above, including one or more machine learning models used for order processing, may be executed at low-footprint devices (such as smart phones, voice-driven personal assistant devices, tablets, laptops, desktops, IoT devices and the like) instead of a conventional computer server located at the premise of a registered restaurant. In effect, as such low-footprint devices have become more capable of running machine learning models such as deep neural network models, the workload distribution policy selected for a given AROMS client may allow more of the processing related to order acquisition to be conducted at the devices.

In some embodiments, a dialog-driven order management service (a general-purpose DOMS or an AROMS) may provide at least two types of functionality. For application developers and administrators, for example, the DOMS may provide tools and mechanisms for developing, dynamically configuring and deploying dialog-driven order management applications if desired. To simplify the presentation, the term "application owners" may be used herein to refer to individuals or organizations involved in the design, development, configuration and deployment of dialog-driven applications which are to be used by end users. As indicated above, a given dialog-driven order processing application may often comprise one or more sequences of bidirectional interactions between end users and resources of a distributed order processing application. Using various easy-to-use programmatic interfaces implemented at a DOMS, such as a graphical user interface of a web-based console, an application developer may be able to specify various aspects of a dialog-driven order processing application if desired, without providing the source code to be used for managing the flow of multi-step interactions of end users with the application. At run-time, after the interactions with the developer regarding the multi-step dialogs with end users have been completed and an executable version of the program has been generated and deployed, various machine learning models of the kind mentioned above may be deployed to implement the logic of the application. Application developers may not need to specify details regarding the particular algorithms to be used, or even be aware of the algorithms that are used in at least some embodiments. In some embodiments, a DOMS may enable the integration of existing applications (which may be executed using a variety of different resources) with a dialog-based front-end capability with a minimum of programming effort. The application owners may use the interfaces of the DOMS to indicate high-level steps of the dialogs needed to identify parameter values associated with orders to be detected using the application, and the programs, services or resources to be invoked to perform or fulfill the tasks after the parameter values for the tasks have been identified using the dialogs in various embodiments.

A given dialog-driven application may indicate one or more "intents" associated with a particular problem domain. Each of the intents may correspond to a particular task to be initiated on behalf of an end user of the application (such as, for example, ordering a particular menu item of a meal), and each intent may be identified and executed based on analysis of a collection of end user inputs or utterances. Any desired combinations of a number of different types of resources may be used to fulfill the application tasks or intents in various embodiments, including resources of other network-accessible services. In general, much of the complexity typically associated with dialog-driven applications (including providing the logic for the dialog steps, or for the logic for the dialog capture and interpretation) may be eliminated, leaving application owners free to concentrate on the business logic of their applications. By quickly adding dialog-driven front-ends to existing or new applications, the number of end user engagement channels available for the applications may be substantially expanded in many cases, and the increased ease of use resulting from natural language interactions may expand the size of the applications' customer base.

According to some embodiments, a dialog-drive order management service may be implemented as a subcomponent of a machine learning service at a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources (e.g., including resources at which software containers used for running instrumented machine learning models are executed) that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as a machine learning service (which may also be referred to as an analytics service) comprising the DOMS. In some embodiments, a DOMS or an AROMS may be implemented as a separate service from a more general machine learning service of a provider network. A VCS may also be referred to as an elastic compute service, virtual machines service, computing cloud service, compute engine, and/or cloud compute in various implementations. Programmatic interfaces of the machine learning service or DOMS may be used by clients to indicate various preferences regarding their order management objectives in at least some embodiments.

Example System Environment

FIG. 1 illustrates an example system environment in which a dialog-driven order management service which utilizes machine learning models for recognition and relationship extraction of several categories of ordering-related concepts may be implemented, according to at least some embodiments. As shown, system 100 comprises resources and artifacts of a dialog-driven order management service (DOMS) 102, including control plane components 111, dialog-driven ordering metadata repository 116, order acquisition application building tools 120, order acquisition coordinators (OACs) 156, fulfilment resources 157, configuration interactions manager 140, and a collection of machine learning resources 160 including several types of machine learning models and a continuous model training coordinator 165. Individual ones of these DOMS components may be implemented using some combination of hardware and software of one or more computing devices. DOMS 102 may allow owners of a variety of services or applications which communicate with end users using informal conversations or dialogs to automate processing associated with interpreting and responding to the end users' communications in the depicted embodiment. Such applications or services may be referred to as dialog-enabled services (DSs) in at least some embodiments. The DOMS 102 may be said to have at least two categories of clients: (a) direct clients such as the owners/managers of DSs, and (b) the end users or customers of the DSs. In some cases, the end users of the DSs may not be aware that a DOMS is being utilized on their behalf; such end users may simply interact with the DS using conversational interfaces, and the processing of their utterances may be performed transparently by the DOMS. A variety of DSs may utilize the DOMS for managing orders in different embodiments, such as food ordering services for restaurants, grocery store services, retail store services, appointment scheduling services, maintenance services for various types of items, repair services for various types of items, and so on. A variety of devices may be utilized by end users of DSs to provide their conversational input regarding orders in various embodiments; for example, end user input or utterances may be obtained/detected via voice-driven assistant devices, phones, portable computing devices, wearable computing devices, augmented reality devices, virtual reality devices, sensors located in a drive-through ordering area, touch interfaces and the like.

At least some of the dialog-enabled services may have a respective associated set of offerings (e.g., contents of a menu or catalog) which can be ordered via conversational interactions in various embodiments. The set of offerings may be defined according to a schema selected by the DS owner or manager in at least some embodiments (such as a schema dividing the menu of a restaurant into sections such as entrees, drinks, main courses, desserts, etc., with some composite menu items comprising combinations of lower-level items). In the example scenario depicted in FIG. 1, DS 101A comprises orderable offering set 105A (e.g., a restaurant's menu with a hierarchy of items), offerings-related schema 104A and a set of targeted types of conversational interfaces 103A (such as phones, text message interfaces, DTMF interfaces, and so on). Similarly, DS 101B comprises orderable offering set 105B (e.g., a retail establishment's catalog with a hierarchy of items or entities), offerings-related schema 104B and a set of targeted types of conversational interfaces 103B, while DS 101C comprises orderable offering set 105C (e.g., appliance repair options), offerings-related schema 104C and a set of targeted types of conversational interfaces 103C.

Orders for the offerings of each of the DSs 101 may be processed at least in part using resources of the DOMS 102 in the depicted embodiment. The DOMS 102 may, for example, enable the DS owners to request the automated processing of orders for their respective offering sets via programmatic interfaces 177, e.g., by submitting DS registration requests. A variety of programmatic interfaces 177 may be implemented in different embodiments, such as web-based consoles, graphical user interfaces, command-line tools, application programming interfaces (APIs) and the like. Requests pertaining to the initiation or configuration of order processing on behalf of DS clients may be submitted from a variety of client devices 170 (e.g., phones, laptops, desktops, mobile computing devices and the like) in different embodiments. The client requests may be parsed initially at a configuration interactions manager 140, which may in turn pass on internal versions of the requests to other components of the DOMS such as order acquisition coordinators (OACs) 156, continuous model training coordinator 165 and the like in the depicted embodiment. Control plane components 111 of the DOMS may be responsible for administration of the DOMS itself, e.g., for provisioning and scaling the resources needed to implement other components of the DOMS, monitoring the responsiveness of the DOMS, implementing high availability and fault tolerance techniques for the data and metadata stored as well as the operations performed at the DOMS, and so on in the depicted embodiment.

Continuous model training coordinator (CMTC) 165 may be responsible for training (and, as needed, re-training) a variety of machine learning models utilized for order acquisition and fulfilment for the DSs 101 in the depicted embodiment, including hierarchical concept recognition models 161, co-reference detection and resolution models 162, relationship extraction models 163, as well as speech-to-text and text-to-speech conversion models 164. In one implementation, the CMTC may train a set of baseline or template models for various problem domains, such as the restaurant order problem domain (applicable to DS 101A), the retail problem domain (applicable to DS 101B), appliance repair problem domain (applicable to DS 101C), and so on. In at least some embodiments, the machine learning resources of the DOMS 102 may include training data generators responsible for generating synthetic example utterances for various problem domains, and such generators may be used to train the baseline or template models. When a DS owner signs on for the use of the DOMS, in some embodiments the DS owner may supply customization data sets (such as the actual menu of a restaurant, as opposed to a generic menu which was used for training the baseline models), and such customization data sets may be used to re-train the baseline models. Such re-trained or customized models may then be used to manage the order processing for the DS owner. In at least some embodiments, clients of the DOMS may provide at least some training examples via programmatic interfaces of the DOMS, so at least some subset of the training data for the machine learning models may not have to be synthesized at the DOMS. Note that while FIG. 1 shows hierarchical concept recognition models 161, co-reference detection and resolution models 162, relationship extraction models, and speech/text conversion models 164 as separate entities, the number of distinct models used may vary in different embodiments. For example, in some embodiments, co-reference analysis and concept recognition may be performed using a common set of one or more models, or relationship extraction functionality may be performed in the same model which is used for co-reference analysis.

The menus/catalogs and customization data may be stored at dialog-driven ordering metadata repository 116 in the depicted embodiment, along with DS descriptors, custom code which may be provided by some DOMS clients, configuration settings for the dialog-based interactions of each DS (e.g., the maximum expected duration of an utterance, the modes or channels of communication the DS end users are expected to utilize, criteria to be used to introduce in-person interactions into a conversation instead of relying entirely on machine learning models). Some DOMS clients may wish to use order acquisition application building tools 120 (e.g., graphical user interfaces) to specify the kinds of intents expected to be detected in user dialogs, optional and required parameters for the intents, and so on, without having to write code for the applications. Other DOMS clients may leave the design and implementation of the application for processing the orders of a DS to the DOMS, and may not use order acquisition application building tools.

After the machine learning models for order processing of a particular DS have been trained (and customized if desired), they may be employed to analyze utterances of end users of the DS in the depicted embodiment, e.g., by an order acquisition coordinator (OAC) 156. A representation (e.g., a text representation of a set of vocalizations) of one or more utterances of a user of a DS may be obtained, e.g., using a speech-to-text model applied to a set of voice signals captured at a microphone. At least some offerings of the offerings of the DS may be organized in a hierarchy, in which for example some entities or items can be added on to others. From the one or more utterances, using a set of one or more machine learning models including at least one hierarchical concept recognition model, a plurality of concepts may be identified in various embodiments. The plurality of concepts may include a primary or concrete concept representing a particular offering which is included in the catalog or menu of the DS and at least a secondary or auxiliary concept. The auxiliary concept may not directly represent an offering included in the catalog or menu, but may provide additional information about a concrete offering (e.g., size, quantity or other attributes of the concrete offering) which can be used to populate one or more parameters of a service order for the concrete offering in some embodiments. The initial plurality of concepts may be transformed into a smaller set of concepts by eliminating co-references in some embodiments, e.g., using a co-reference detection and resolution model 162 in various embodiments. In other cases, a such a reduced set of concepts may not be identified, and the Based on the analysis of some combination of utterances of the user (which may be interspersed with utterances generated by the DOMS), the OAC may eventually construct a graph comprising a plurality of nodes and a plurality of edges. Individual nodes of the graph may represent respective concepts of the reduced or smaller set of concepts (obtained from the initial plurality of concepts using co-reference analysis) or the original set of concepts (if no co-references were found, or co-reference analysis was not performed). Individual edges may represent various types of relationships among the concepts, including for example hierarchical relationships, which are inferred using one or more relationship extraction models 163 in the depicted embodiment. Based at least on the graph, one or more parameters of a service order for one or more offerings of the DS may be populated by the AOC, including for example a pair of offerings which are part of a given hierarchy of offerings in the DS catalog or menu in various embodiments. The service order may then be transmitted to an order fulfillment resource 157 in the depicted embodiment, which may initiate operations to cause the ordered offerings to be provided or sent to the user whose utterances were analyzed to populate the service order. In at least some cases, order fulfilment and/or other operations involved in order processing may be conducted using at least some resources 150 external to the DOMS 102. For example, a dynamically provisioned event driven computing service may be used to perform some actions related to order fulfillment, such as submitting a request to a food delivery service to transport an ordered item to the DS customer, or causing a shipment of a retail catalog item to be initiated from a warehouse of the DS owner.

To illustrate the concepts involved, examples from the restaurant order processing domain are used in much of the following description. It is noted that the techniques presented herein may be employed with equal success in any of a variety of problem domains in which informal dialog-based interactions with end users of a service may occur, including retail, repair, health care or wellness appointment management, and so on, and that the techniques are not limited to restaurant or food-related services.

Example of Informal User Input from which Orders May have to be Determined

Figure 2:
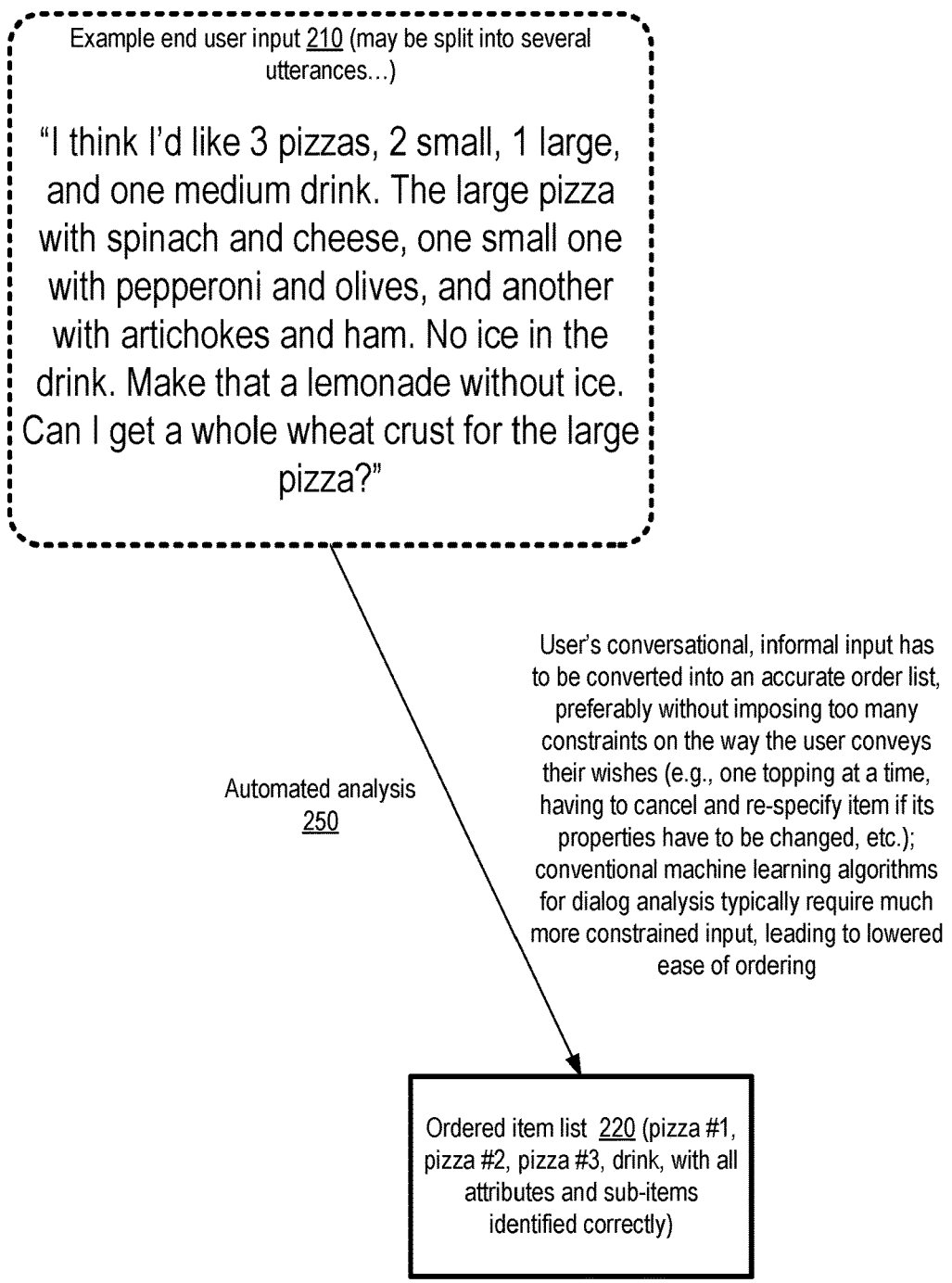
FIG. 2 illustrates an example of conversational input from which various fields of an order for restaurant food may have to be populated, according to at least some embodiments.

FIG. 2 illustrates an example of conversational input from which various fields of an order for restaurant food may have to be populated, according to at least some embodiments. In the depicted scenario, example end user input 210, which may in some cases be split among several different utterances separated by system-generated responses or silence periods, may be analyzed using resources of a DOMS. The end user input 210 comprises the sequence of sentences "I think I'd like 3 pizzas, 2 small, 1 large, and one medium drink. The large pizza with spinach and cheese, one small one with pepperoni and olives, and another with artichokes and ham. No ice in the drink. Make than a lemonade without ice. Can I get a whole wheat crust for the large pizza?"

From this informally-worded set of sentences, the DOMS may be responsible for populating an ordered item list 220 (a list of three pizzas and a drink, with all the attributes of each of the items identified accurately) using automated analysis 250 in the depicted embodiment. Some traditional ordering systems may impose strict constraints on the user input, requiring the user to list ingredients for each pizza one at a time, for example, instead of simply letting the user describe what they want in a natural, unstructured and free-flowing manner as in input 210. In the depicted user input, for example, the user provides information about the drink order in three separate mentions, using a pronoun reference ("that" in the "Make that a lemonade"), repeating that ice is not needed, and so on, which may be hard for traditional ordering systems to interpret correctly. As a result of utilizing the kinds of advanced machine learning models introduced above and described further below, a DOMS similar in functionality to DOMS 102 may be able to significantly enhance the ease of ordering for end customers of a restaurant and other services, compared to the ease of ordering when using some conventional dialog processing systems.

Example Machine Learning Tasks for Dialog-Based Order Processing

Figure 3:
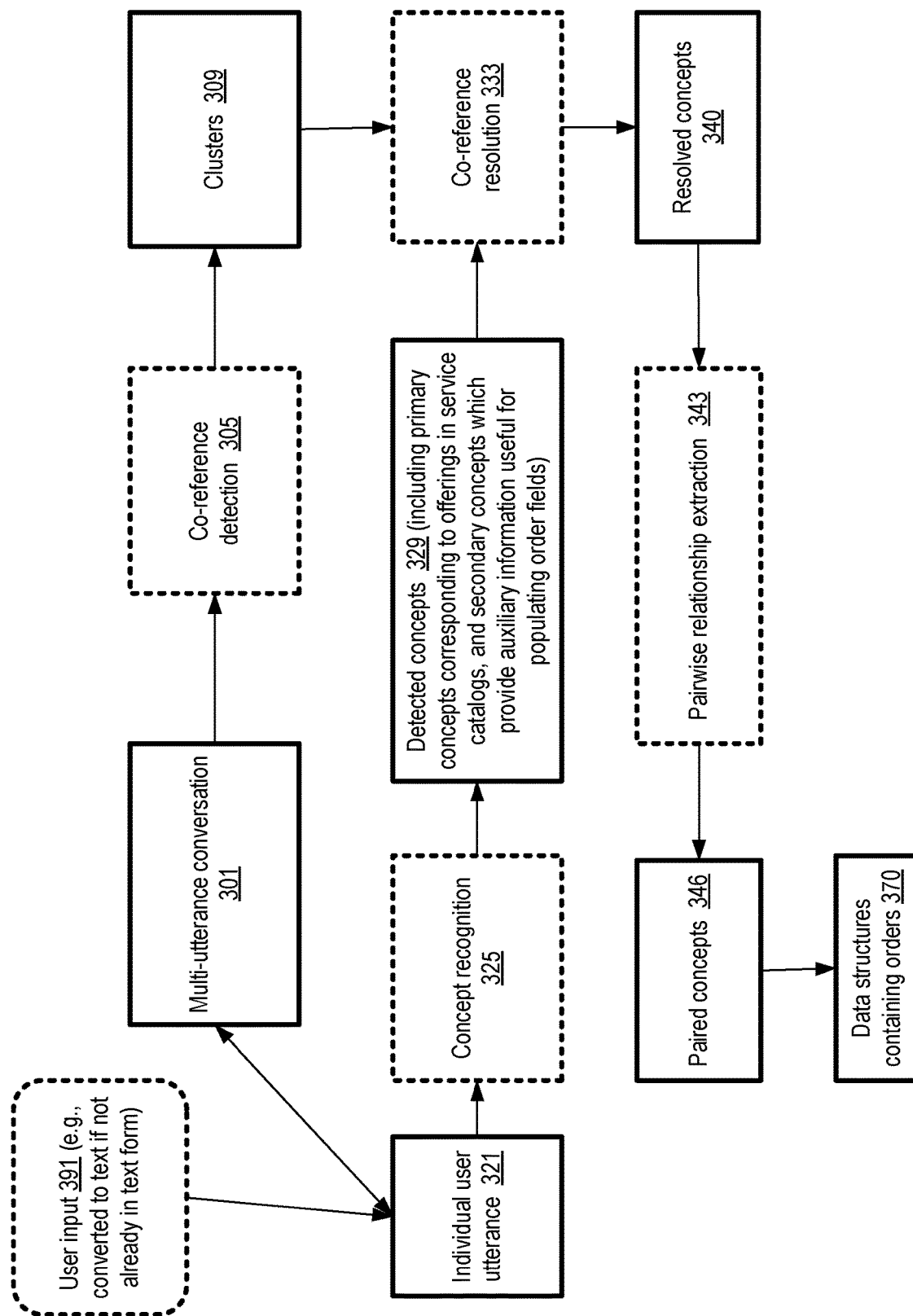
FIG. 3 illustrates an overview of example machine learning tasks which may be conducted for processing dialog-based orders, according to at least some embodiments.

FIG. 3 illustrates an overview of example machine learning tasks which may be conducted for processing dialog-based orders, according to at least some embodiments. In the depicted embodiment, user input 391 may be received at a DOMS similar in functionality and features to DOMS 102 of FIG. 1. The user input may comprise individual user utterances 321 of a multi-utterance conversation 301 conducted by and end user with one or more components of the DOMS, e.g., using client-side devices such as phones, tablets and the like of the end user and/or via client-side devices made accessible to the end user by the provider of a dialog-enabled service (such as microphones, touch screens etc. in a drive-through area of a restaurant). Using one or more machine learning models for concept recognition 325, a number of different types of concepts may be detected in the user input in the depicted embodiment. The detected concepts 329 may comprise, for example, primary concepts or entities representing respective items or offerings of the catalog or menu of the dialog-enabled service, as well as secondary or auxiliary concepts which provide additional information about other detected concepts but may not necessarily represent items or offerings themselves. Such additional information may be useful in populating or filling out various fields of orders for catalog items or offerings in the depicted embodiment. Examples of secondary or auxiliary concepts may include negations of offerings, quantifiers of offerings, size indicators of offerings, overrides of default attributes of offerings, qualitative attributes of offerings (e.g., colors, shapes, etc.) and the like in different embodiments. In at least some embodiments, the machine learning models used for concept recognition may include models that can identify one or more entities of an offering set based on inexact matches. In such a scenario, even if an end user's utterances do not use the exact set of terms or name utilized for an offering O1 within the catalog, such models may be able to determine that the end user intended to specify O1, e.g., based on detecting semantic similarity between terms used by the end user and the information available about O1 in the catalog, based on the context in which the terms are used within a conversation, and/or based on other factors. Models that perform this type of recognition of offerings may be referred to as entity resolution models, entity linking models, or synonym-based entity recognition models in some embodiments.

Machine learning models for co-reference detection 305 may be applied to multiple utterances of a multi-utterance conversation 301 in some embodiments, and may not be restricted to co-references within a single utterance. Thus, if an offering O1 of the service is mentioned in a first utterance U1 of a multi-utterance conversation by an end user, and a pronoun or referencing term such as "it" or "that" is used in an utterance U2 which is made later by the end user (e.g., after an intermediary utterance generated by the DOMS in response to U1 is directed to and received by the end user), the model or models used for co-reference detection 305 may be able to detect that the pronoun or referencing term refers to O1, even if O1 itself is not mentioned in utterance U2. Co-reference groups (such as O1, "it" and "that" in the above example) or clusters 309, indicating groups of mentioned concepts which appear to refer to the same underlying offering or concept, may be produced as output by the co-reference detection models in some embodiments. One or more models for co-reference resolution 333 may then analyze the clusters or co-reference groups, and replace some or all of the co-references with instances of their referenced concept in a data structure (such as a graph) representing the conversation in some embodiments. As such, co-reference resolution may in effect reduce the number of concepts which have to be analyzed further in some embodiments to populate an order data structure, and generate a set of resolved concepts 340 which is smaller (or at least no0 larger than) than the initial set of detected concepts. Co-reference detection and resolution tasks may collectively be referred to as co-reference analysis tasks in various embodiments.

One or more machine learning models trained to perform pairwise relationship extraction 343 may generate a set of paired concepts 346 from the resolved concepts 340 in the depicted embodiment. In the set of paired concepts 346, logical relationships such as add-on, parent-child or sibling relationships among hierarchies of offerings of the dialog-enabled service mentioned in the conversations, quantities or sizes of offerings, negations of offering properties, and so on may be indicated in various embodiments. From the paired concepts information, data structures containing orders 370 for offerings indicated in the conversation may be prepared and/or finalized in the depicted embodiment, and transmitted to the appropriate order-fulfilment resources. In some embodiments, several of the types of machine learning tasks shown separately in FIG. 3 (e.g., in elements 305, 333, 325 and 343) may be performed using a single model instead of separate models. Furthermore, some or all of the types of machine learning tasks shown in FIG. 3 may be performed at least partly in parallel in some embodiments, for the same conversation and/or for different conversations.

Note that in at least some embodiments, machine learning models may also be used for other tasks involved in order processing, which are not shown in FIG. 3, such as speech-to-text conversion or automated speech recognition (ASR), text-to-speech conversion, sentiment analysis, and so on. In at least one embodiment, additional machine learning models may be employed for processing and preparing interruptible streams of bi-directional informal conversations between end users and the DOMS. Such models may for example manage dialog state, e.g., by keeping track of whether some previously presented portion of an utterance directed to an end user is to be discarded or repeated when the end user interrupts a DOMS-presented utterance, by retaining representations of partially-parameterized order intents across multiple end-user utterances until all required parameters of the intents have been determined, and so on. In various embodiments, before an order can be fulfilled, one or more machine learning models may be used to ensure that a set of expected properties of the order have been determined. For example, if an end user has not specified a drink or a dessert, and drinks/desserts are usually part of an order received at the dialog-enabled service, in some embodiments such models may generate and present utterances that request the end user to specify a drink (or confirm that no drink is needed) or a dessert (or confirm that no dessert is needed). Such models may be referred to as dialog completion models in some embodiments. In various embodiments, one or more contextual interpretation models may be utilized, which identify specific entities detected within user utterances based on the context in which the user utterances were provided. For example, if a user utterance comprises the word "chocolate", a contextual interpretation model may be able to distinguish whether the word refers to a chocolate milkshake (e.g., if the word was uttered in response to a DOMS-presented question "What type of milkshake would you like?") or a piece of chocolate cake (e.g., if the word was uttered in response to a DOMS-presented question "What type of cake would you like?"). As such, a given term, word or phrase, when used in one context, may be interpreted as one offering using a contextual interpretation model, and the same term, word or phrase may be interpreted as a different offering when used in a different context in at least some embodiments.

According to some embodiments, spans of portions of a text version of conversational input (obtained, for example, using one or more speech-to-text transformation models or automated speech recognition models) may be annotated for both primary concepts and secondary or auxiliary concepts. Token level tags may be generated from the annotated spans using techniques similar to inside-outside-beginning (IOB) tagging or beginning-outside-inside-end-start (BOIES) tagging.

A variety of neural network-based models may be employed for different phases of the analysis depicted in FIG. 3 in different embodiments. In some embodiments, a neural network based hierarchical encoder decoder (HED) sequence tagger may be used. In the HED approach, word embeddings, in which each token or word of the user input is mapped to a vector, may be passed on to a word level encoder. Randomly initialized vectors or pre-trained word vectors using Glove (Global vectors for word representation) or word2vec may be employed in different embodiments. In some embodiments, a character based vector (obtained, for example, using a recurrent neural network (RNN) or a convolutional neural network (CNN)) may be concatenated to the word embedding vector before the augmented embeddings are passed to the word level encoder. The encoder itself may comprise an RNN, a CNN or a transformer in different embodiments. The vectors obtained from the encoder and the augmented word embeddings may be concatenated using residual neural network connections and passed to a decoder. The decoder may comprise, for example, one or more fully connected neural network layers followed by a softmax layer or an auto-regressive decoder in which each token is informed of the final tagging output of the previous token. This approach may help in developing a span level understanding of the input using token level classifications and is often more effective than a simple independent decoder.

In at least one embodiment, sequence taggers based on Bidirectional Encoder Representations from Transformers, or BERT, may be employed. In this approach, one or more pre-trained language models may be used to encode an input sequence of words (broken down into sub-word units in some cases). Algorithms such as ROBERTA (A Robustly Optimized BERT Pretraining Approach), XLM-R (a cross-lingual language model), or multilingual BERT may be employed for generating encodings in some embodiments. The output vectors from these encoders may be passed through one or more fully-connected layers and an independent softmax layer to determine the final token level output class.

In some embodiments, inductive biases based on the catalog or menu with respect to which order processing is being performed may be introduced. For example, for each word or token in the input test, a "gazetteer" bit may be flipped to "1" from a default setting of "0" if the word is part of a span that also occurs in the catalog. For example, if "cheese pizza" is in the catalog, the gazetteer bits may be set as follows for the utterance "I would like a cheese pizza"" "I|0 would|0 like|0 a|0 cheese|1 pizza|1". In some embodiments, multiple gazetteer bits may be employed, e.g., to support multiple catalogs of concepts. The gazetteer bits may be embedded into randomly initialized embeddings per gazetteer, and the embedding vectors may be concatenated with word-level input vectors as discussed in the context of the HED approach above. Adding gazetteer bits in this way may be especially helpful in scenarios in which catalog items do not necessarily correspond to commonly-used terms of the language being used.

For relationship extraction, in some embodiments a neural network-based model based on models used for temporal ordering of events (e.g., for identifying whether a given event occurred before, after, at the same time as, or at an unclear time with respect to, another event) may be employed. Such ordering-focused models may be applicable because the kinds of concept-to-concept relationships (is-size-of (small, pizza) for indicating a small pizza) identified in a user's conversational input may often be mapped to an order (e.g., the order of the operands or parameters in the is-size-of relation matters). For co-reference resolution (which may be performed across distinct utterances of a conversation), a neural network model which considers all spans in the conversation as possible mentions, and learns distributions over possible antecedents for each of the spans may be employed. In at least some embodiments, the co-reference resolution model may include long short-term memory units (LSTMs). Other types of machine learning models may be employed in different embodiments for hierarchical concept recognition, co-reference resolution and/or relationship extraction; in some embodiments, neural network models may not necessarily be employed for some of the order analysis tasks.

Example Model Training Methodologies for Order Processing

Figure 4:
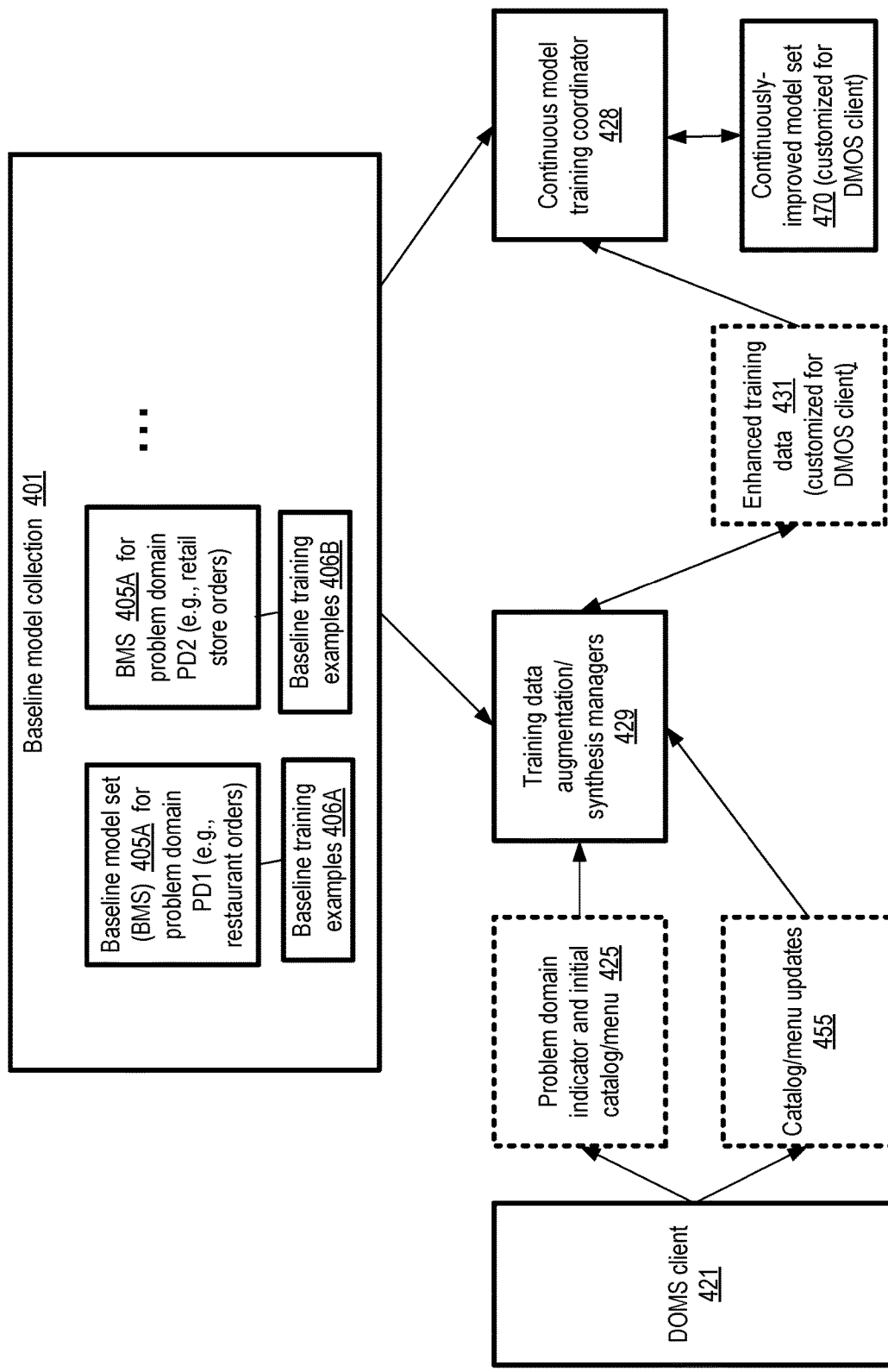
FIG. 4 illustrates an overview of example methodologies for training machine learning models for dialog-based order processing, according to at least some embodiments.

FIG. 4 illustrates an overview of example methodologies for training machine learning models for dialog-based order processing, according to at least some embodiments. At a DOMS similar in features and functionality to DOMS 102 of FIG. 1, a baseline model collection 401 (e.g., including models to perform some or all of the kinds of tasks machine learning tasks discussed in the context of FIG. 3) may be prepared proactively for processing orders of several different problem domains, such as restaurant orders, retail orders and the like in the depicted embodiment. For each set of models, respective sets of baseline training examples may be prepared and/or obtained at the DOMS. For example, baseline model set (BMS) 405A may be developed and trained for problem domain PD1 (e.g., restaurant orders) using baseline training examples 406A, and BMS 405A may be developed and trained for problem domain PD2 (e.g., retail store orders) using baseline training examples 406B. The baseline models may also be referred to as model templates in some embodiments, and may be extended and customized for different DOMS customers as needed.

A DOMS client 421 (such as a restaurant owner/manager) may provide a problem domain indicator and an initial version of a catalog or menu 425 to the DOMS. Training data augmentation/synthesis managers 429 of the DOMS (which may be subcomponents of continuous model training coordinator (CMTC) 428, or may comprise programs invoked by the CMTC 428) may generate enhanced training data 431 customized for the DOMS client 421, e.g., using the baseline training examples 406 of the appropriate problem domain as input. For example, if DOMS client 421 wishes to automate order processing for a restaurant specializing in uncommon dishes from a particular national cuisine, a set of baseline training examples which refer to orders for common dishes such as pasta or sandwiches may be customized to include references to the uncommon dishes. The enhanced training data 431 may then be used to re-train the baseline model set 405 for the client 421 in the depicted embodiment by the CMTC 429 (which may be similar in functionality to CMTC 165 of FIG. 1).

Over time, the menu or catalog of the service for which automated order processing is to be performed on behalf of DOMS client 421 may change in various embodiments. Such changes or updates 455 may be propagated to the DOMS, and used to further customize the training data and further re-train the models being used for the DOMS client, resulting in a continuously-improved model set 470 which is customized for the evolving requirements of the DOMS client in the depicted embodiment.

Example Schemas Used During Order Acquisition

Figure 5:
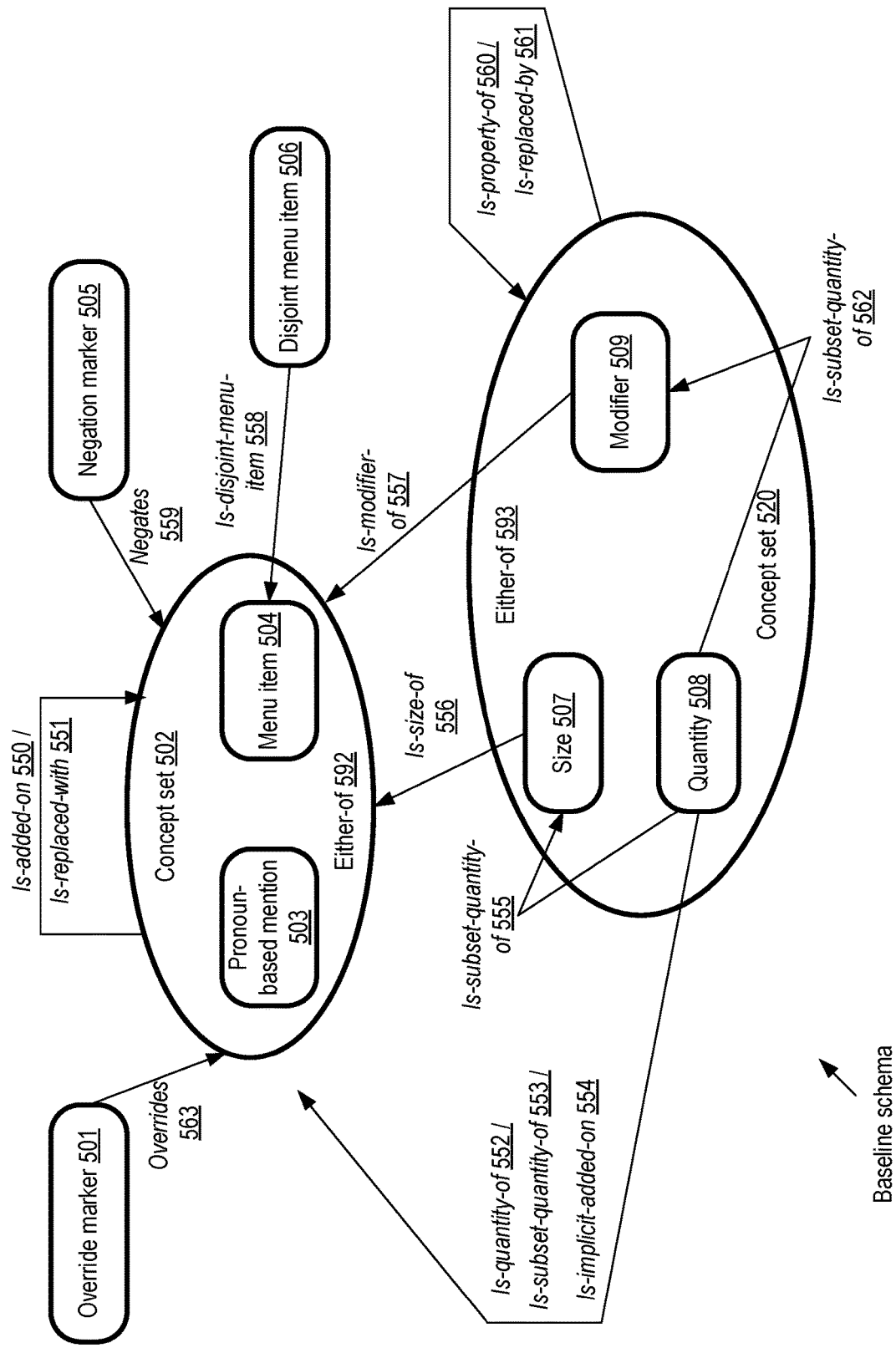
FIG. 5 illustrates an example baseline schema which may be used for generating preliminary graphs representing food-related orders, according to at least some embodiments.

FIG. 5 illustrates an example baseline schema which may be used for generating preliminary graphs representing food-related orders, according to at least some embodiments. In the example scenario shown in FIG. 5, menu items 504 and pronoun-based mentions of menu items represent a first concept set 502 of linguistically similar concepts (i.e., concepts which can at least in some cases be treated similarly when interpreting or analyzing a set of utterances) of a baseline schema 500 for concepts and relationships identified using machine learning models of the kinds introduced above. Similarly, concepts corresponding to size 507, quantity 508 and qualitative modifiers 509 form a second concept set 520. A preliminary graph comprising nodes representing examples of the different concepts shown in FIG. 5 may be constructed in various embodiments using the machine learning models, with edges of the graph indicating logical relationships (of the kinds shown using arrows in FIG. 5) among the concepts. Such preliminary graphs may be transformed during various stages of the dialog analysis until an order data structure's fields are filled, as discussed below in the context of FIG. 6 and FIG. 7.

The "either-of" labels 592 and 593 indicate that with respect to inbound arrows representing relationships, the relationship can apply to any one of the members of the concept group. For example, the is-size-of 556 relationship associated with a concept represented by size 507 may apply to either of the members of concept set 502—a menu item 504, or a pronoun-based mention 503.

The baseline schema 500 also includes concepts for override markers 501 (indicators that one or more properties of another concept mentioned in a conversation are being overridden in a user utterance), as indicated by the overrides relationship arrow 563. Similarly, negation markers 505 (e.g., "no", "without", or "hold the") can indicate the negation of offerings corresponding to any of the concepts of concept set 502, as indicated by negates relationship 559. In at least some embodiments, disjoint menu items 506 may be recognized using the machine learning models. A disjoint menu item may for example comprise at least two groups of detected language tokens or words which collectively represent a menu item, and which may be disjoint in the sense that the two sets are separated by silences, other tokens or words that do not represent the menu item. The is-disjoint-menu item relationship 558 may be used to link such tokens or token groups in a preliminary graph.

An is-modifier-of relationship 557 may be identified between a modifier 509 and a member of concept set 502 in the depicted embodiment. An is-quantity-of relationship 552, is-subset-quantity-of relationship 553, or is-implicit-added-on relationship 554 may be identified between a quantity 508 and a member of concept set 502. In some cases, an is-subset-quantity-of relationship 555 or 562 may apply to a quantity and a size, or to a quantity and a modifier. Is-property-of relationships 560 and/or is-replaced-by relationships 561 may apply between the members of concept set 520. Is-added-on relationships 550, and is-replaced-with relationships 551, may be identified between members of concept set 502. The is-added-on relationship (which can be explicitly indicated in a user's utterance, or implied as in the case of is-implicit-added-on relationship 554) represent examples of hierarchical relationships among concepts, in which for example one menu item or ingredient is added on to another menu item. Concrete examples of some of the concepts and relationships illustrated in FIG. 5 are provided below in the context of FIG. 8 and FIG. 9. In some embodiments, a baseline schema may include "is-parent-of", "is-child-of", "is-sibling-of", "is-part-of" or other similar relationships, not shown in FIG. 5, to represent other types of hierarchical relationships between recognized concepts.

According to various embodiments, the training data used to train or customize the machine learning models (e.g., hierarchical concept recognition models, co-reference analysis models, and relationship analysis models) for a given client of a DOMS similar to DOMS 102 of FIG. 1 may include labeled examples of various types of concepts and relationships indicated in a baseline schema identified for the given client. In at least some embodiments, the client may provide at least a portion of their preferred baseline schema via programmatic interfaces to the DOMS, along with guidance regarding how preliminary graphs corresponding to the baseline schema are to be transformed to fill out the attributes or fields of a data structure representing a service order. The types of concepts and relationship included in a baseline schema may differ from one problem domain to another in at least some embodiments—e.g., a baseline schema for an appliance repair service may incorporate different concepts and/or relationships than those shown for food-related orders.

Figure 6:
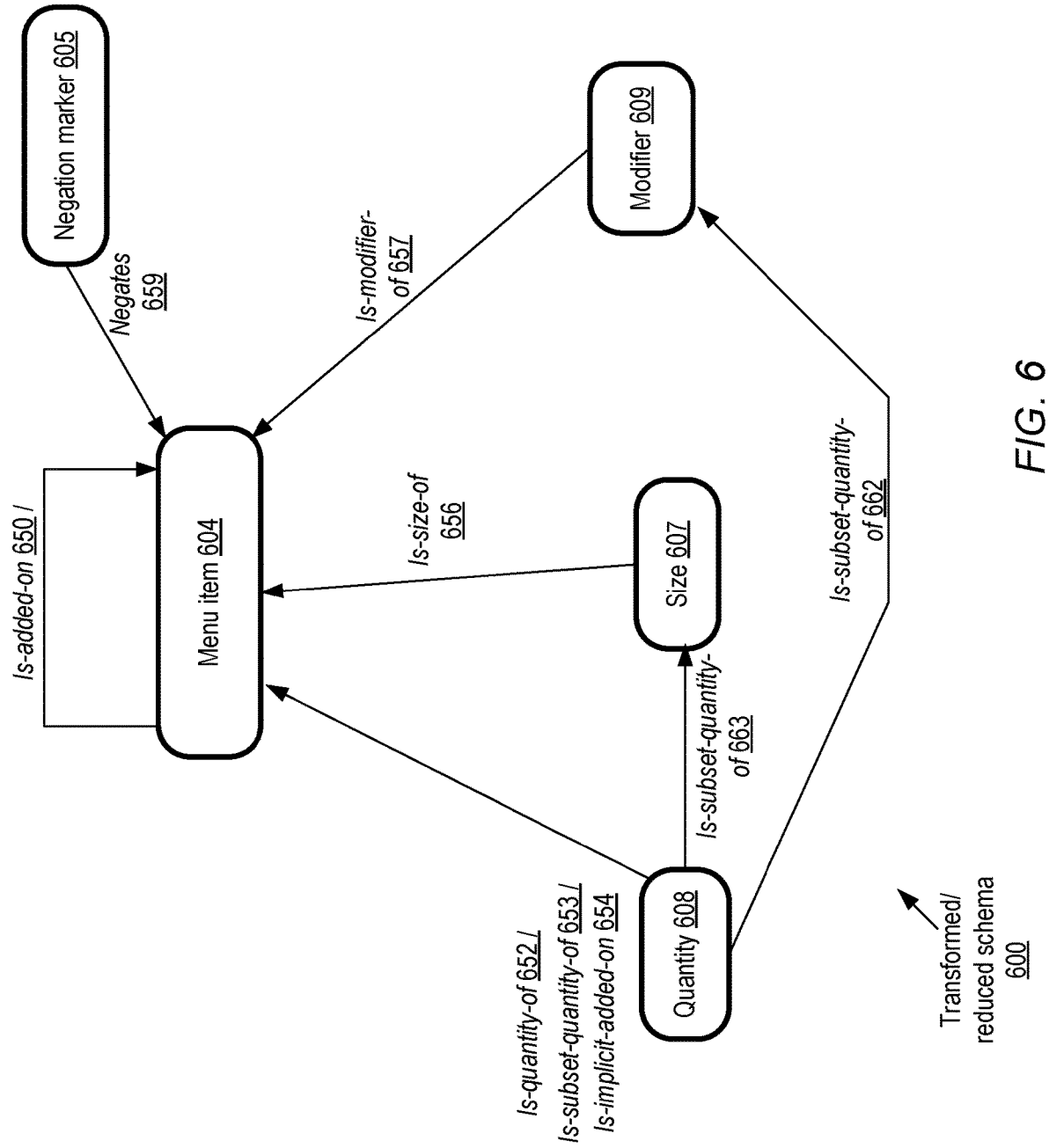
FIG. 6 illustrates an example schema for a reduced graph which may be derived from a preliminary graph during the processing of food-related orders, according to at least some embodiments.

FIG. 6 illustrates an example schema for a reduced graph which may be derived from a preliminary graph during the processing of food-related orders, according to at least some embodiments. A number of transformations may be applied to a preliminary graph (whose nodes and edges may represent some or all of the concepts and relationships shown in FIG. 5) with the help of one or more machine learning models of the kind described earlier to obtain a reduced graph whose nodes and edges correspond to concepts and relationships shown in FIG. 6 in various embodiments. For example, examples of pronoun-based-mentions may be replaced by corresponding menu items (which were referenced using the pronouns) using co-reference analysis, thus eliminating the pronoun-based mention nodes of the preliminary graph. A group of concepts related by is-disjoint-menu-item relationships may be combined into a single menu item. In-place replacements of menu items may be performed based on the is-replaced-with and is-property-of relationships.

As a result of these and other similar transformations, a simplified or reduced schema graph 600 whose nodes represent menu items 604, quantities 608, sizes 607, modifiers 609, and negation markers 605 may be obtained in various embodiments. Relationships indicated in the simplified or reduced graph may include, for example, is-quantity-of 652, is-subset-quantity-of 653, is-implicit-added-on 654, is-subset-quantity-of 663, is-subset-quantity-of 662, is-size-of 656, is-added-on 650, negates 659 and is-modifier-of 657. In effect, the reduced graph or simplified graph represents the results of inferences generated using the machine learning models, which eliminate some of the potential duplicate references and ambiguities that might exist in the original set of user utterances which are being analyzed.

Figure 7:
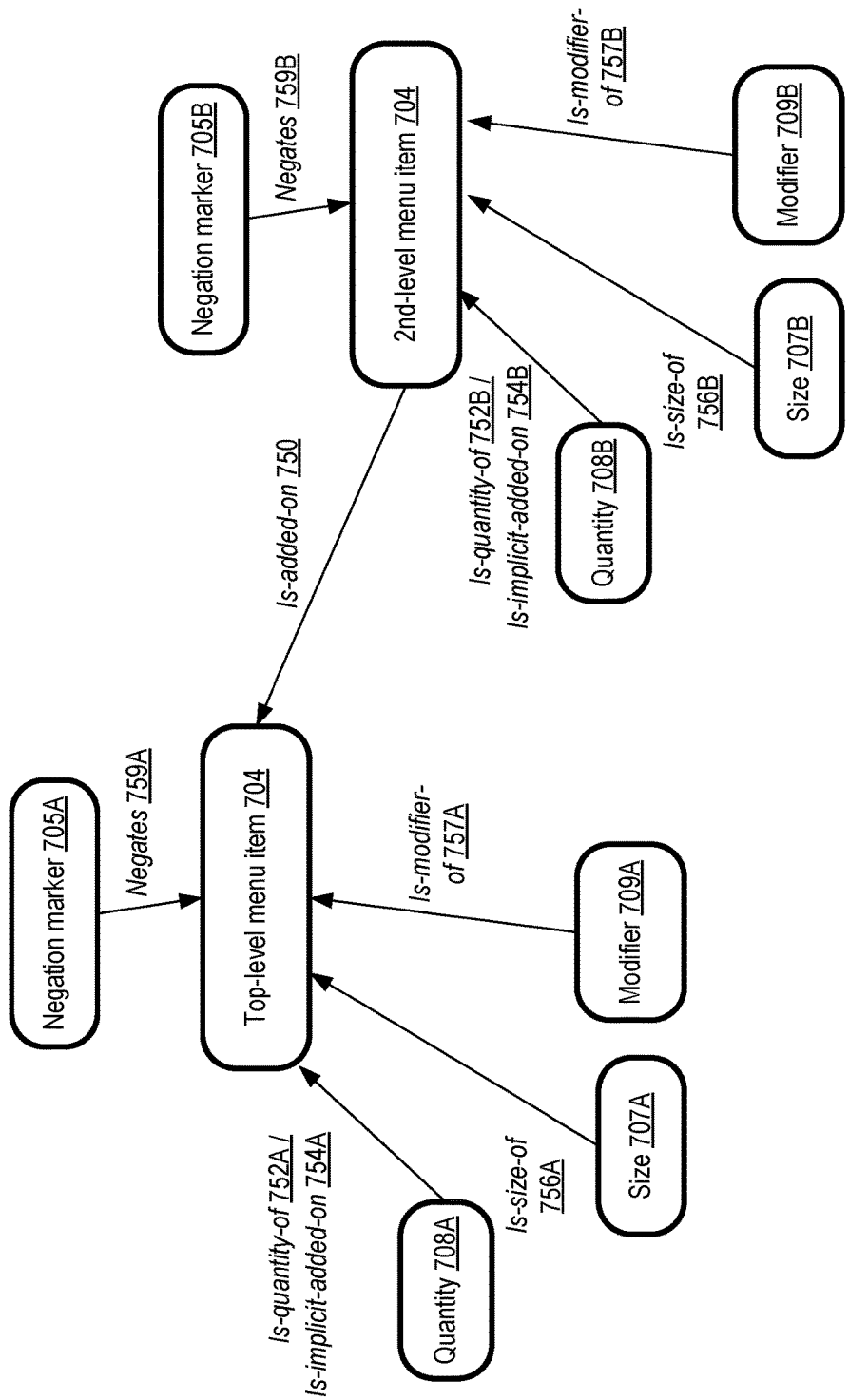
FIG. 7 illustrates an example graph representing two layers of a hierarchy of food offerings which may be generated to populate fields of food-related orders, according to at least some embodiments.

From reduced graphs representing instances of the concepts and relationships shown in FIG. 6, a multi-layer graph may be constructed, in which each layer represents menu items of a respective level of a hierarchy in various embodiments. FIG. 7 illustrates an example graph representing two layers of a hierarchy of food offerings which may be generated to populate fields of food-related orders, according to at least some embodiments. The graph comprises a top-level menu item 704, and a $2^{nd}$-level menu item 704 which is related by an is-added-on relationship 750 to the top-level menu item. One or both of the two menu items may be linked via an edge of the graph to respective nodes representing negation markers 705A or 705B, quantities 708A or 708B, sizes 707A or 707B, and/or modifiers 709A or 709B. Relationships such as negates 759A or 759B, is-quantity-of 752A or 752B, is-implicit-added-on 754A or 754B, is-size-of 756A or 756B, and/or is-modifier-of 757A or 757B may thus be represented in the two-layer graph in the depicted example scenario. Note that the number of distinct levels of the menu item hierarchy (or, more generally, the hierarchy of offerings of an offering set) may differ in various embodiments from the two levels illustrated in FIG. 6.

Example Order Acquisition

Figure 8:
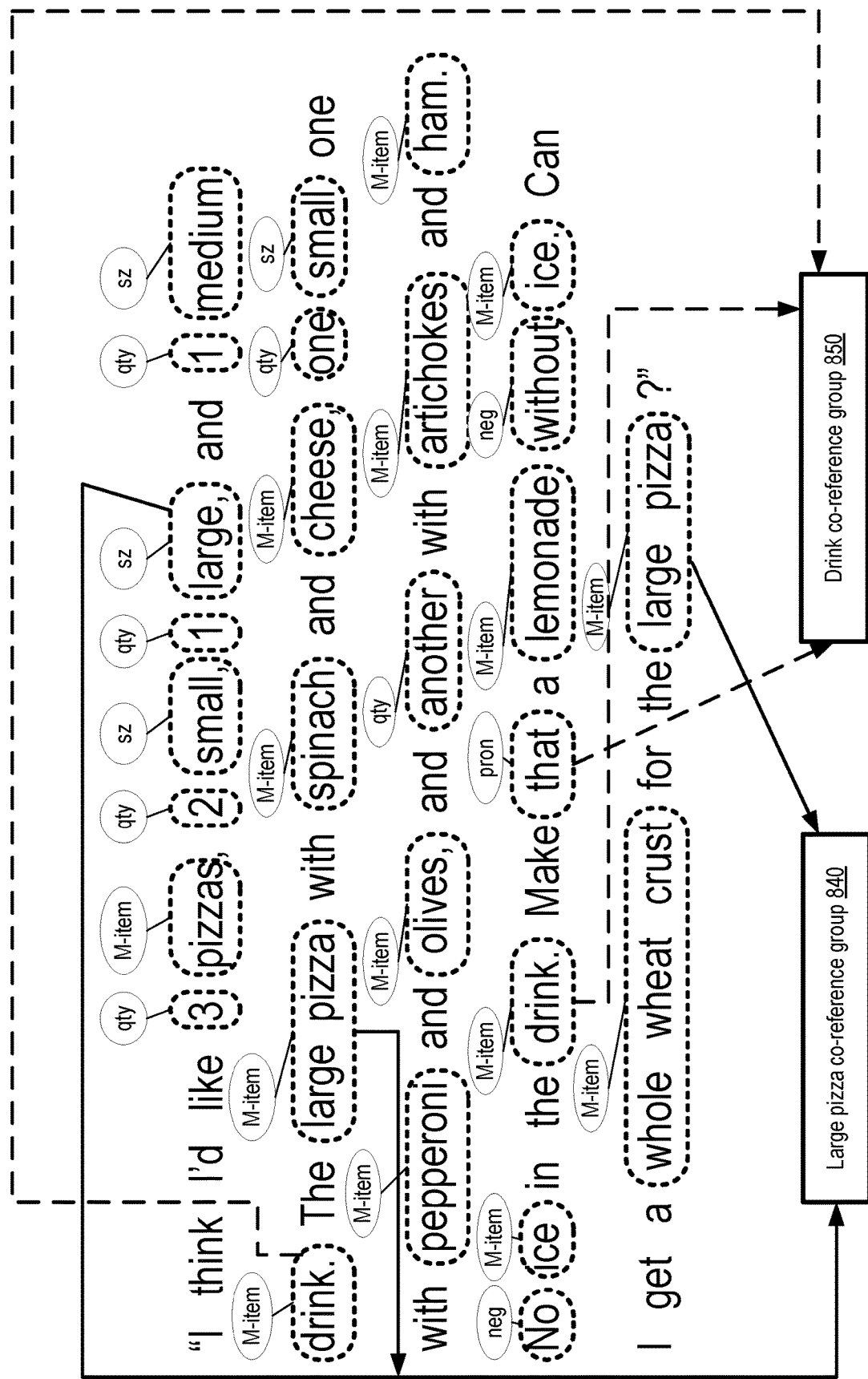
FIG. 8 and FIG. 9 collectively illustrate an example of machine learning based concept recognition, co-reference group recognition and relationship extraction from a collection of informal user input pertaining to an order, according to at least some embodiments.
Figure 9:
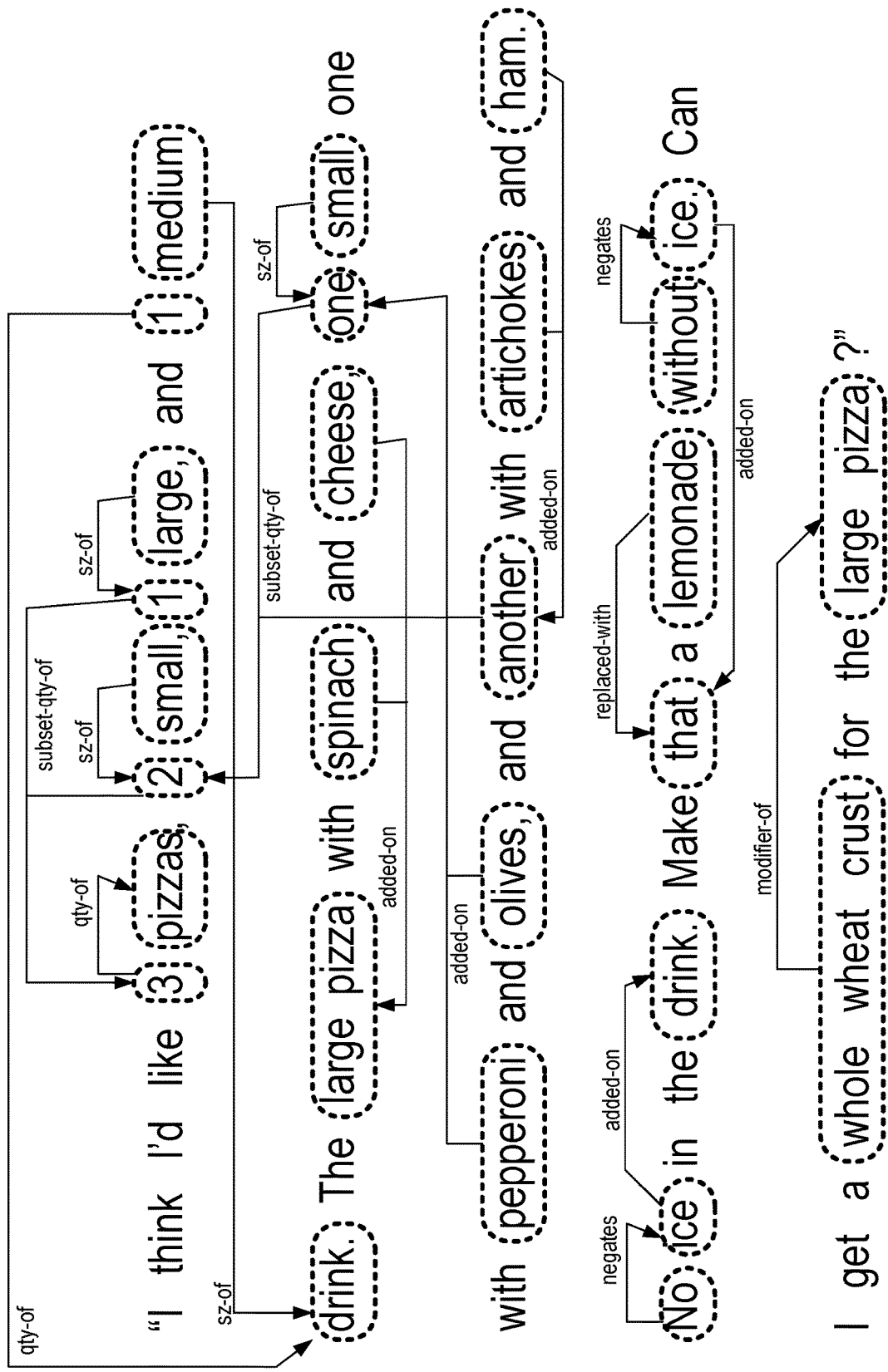

FIG. 8 and FIG. 9 collectively illustrate an example of machine learning based concept recognition, co-reference group recognition and relationship extraction from a collection of informal user input pertaining to an order, according to at least some embodiments. An end user of a restaurant ordering application or service has provided conversational input comprising the set of sentences shown in the context of FIG. 2: "I think I'd like 3 pizzas, 2 small, 1 large, and one medium drink. The large pizza with spinach and cheese, one small one with pepperoni and olives, and another with artichokes and ham. No ice in the drink. Make than a lemonade without ice. Can I get a whole wheat crust for the large pizza?" The sentences may be obtained in text form at the DOMS using a voice-to-text transformation model applied to voice signals obtained from the end user in some embodiments. Note that the numeric terms "1", "2", "3" etc. are included in the example to show that the machine learning models can handle multiple representations of the same concept—e.g., that the models can detect that "1" and "one" represent the same quantity, for example.

Using one or more machine learning models of the kinds introduced earlier, a number of mentions of concepts may be recognized in the utterances of the end user. The label "M-item" is used to indicate recognized instances of menu items in FIG. 8. The label "qty" is used to indicate recognized instances of quantity concepts. The label "sz" is used to indicate recognized instances of size concepts. The label "neg" is used to indicate recognized instances of negation concepts, and the label "pron" is used to indicate a recognized instance of a pronoun-based mention.

Instances of menu items which are recognized in the user's input using one or more machine learning models include (in the order in which they appear in the input) "pizzas", "drink", "large pizza", "spinach", "cheese", "pepperoni", "olives", "artichokes", "ham", "ice", "drink", "lemonade", "ice", "whole wheat crust" and "large pizza". Note that some terms representing the same menu item (such as "drink", "ice" and "large pizza") may be recognized multiple times, and the machine learning models may infer whether the repeated mentions refer to the same underlying concept/entity or not. Instances of concepts representing quantity which are recognized in the user's input include "3", "2", "1", a second "1", "one", and "another". Instances of concepts representing size which are recognized in the user's input include "small", "large", "medium", and "small". Instances of concepts representing negation which are recognized in the user's input include "no", and "without", while "that" is identified as an instance of a pronoun-based mention.

At least two clusters or groups of potential co-references may be identified in the depicted example scenario using one or more machine learning models for co-reference analysis. Large pizza co-reference group 840 includes "large" and two separate mentions of "large pizza", while drink co-reference group 850 comprises two mentions of "drink", and the pronoun-based mention "that".

FIG. 9 shows examples of relationships that may be extracted, using one or more machine learning models, among the concepts identified in the user input and shown in FIG. 8, according to some embodiments. The label "qty-of" indicates the relationship is-quantity-of, while the label "subset-qty-of" indicates the relationship "is-subset-quantity-of". As shown, "3" is inferred to be related to "pizzas" by the is-quantity-of relationship, "2" is inferred to be related to "small" by the is-quantity-of relationship, and "1" is inferred to be related to "small" by the is-quantity-of relationship. "2" and "1" are inferred to be related to "3" by the is-subset-quantity-of relationship, while "one" and "another" are inferred to be related to "2" by the is-subset-quantity-of relationship. The label "sz-of" indicates the relationship "is-size-of", and it is inferred that "small" is the size of 2 pizzas, "large" is the size of 1 pizza, "medium" is the size of "drink", and "small" is the size of the concept represented by the first term "one" in the sequence of terms "one small one".

The label "added-on" indicates the hierarchical relationship "is-added-on" in the example shown in FIG. 9. The menu item concepts "spinach" and "cheese" are inferred to be hierarchically related as add-ons to the menu item referenced by "large pizza", "pepperoni" and "olives" are inferred to be hierarchically related as add-ons to the menu item referenced by the first "one" in the phrase "one small one", "artichokes" and "ham" are inferred to be hierarchically related as add-ons to the menu item referenced by the term "another", and "ice" is hierarchically related as an add-on to the menu item "drink".

Negation relationships are indicated by the label "negates"; the concept "no" negates the first mention of "ice", while "without" negates the second mention of "ice". The label "replaced-with" indicates an inferred "is-replaced-with" relationship between "lemonade" and the pronoun-based reference "that". The menu item "whole wheat crust" is inferred to have an "is-modifier-of" relationship with the "large pizza" menu item mentioned at the end of the user's input. In some embodiments, only binary relationships (relationships between individual pairs of concepts) may be inferred using relationship extraction models, while in other embodiments multiple-way relationships may also be inferred.

Figure 10:
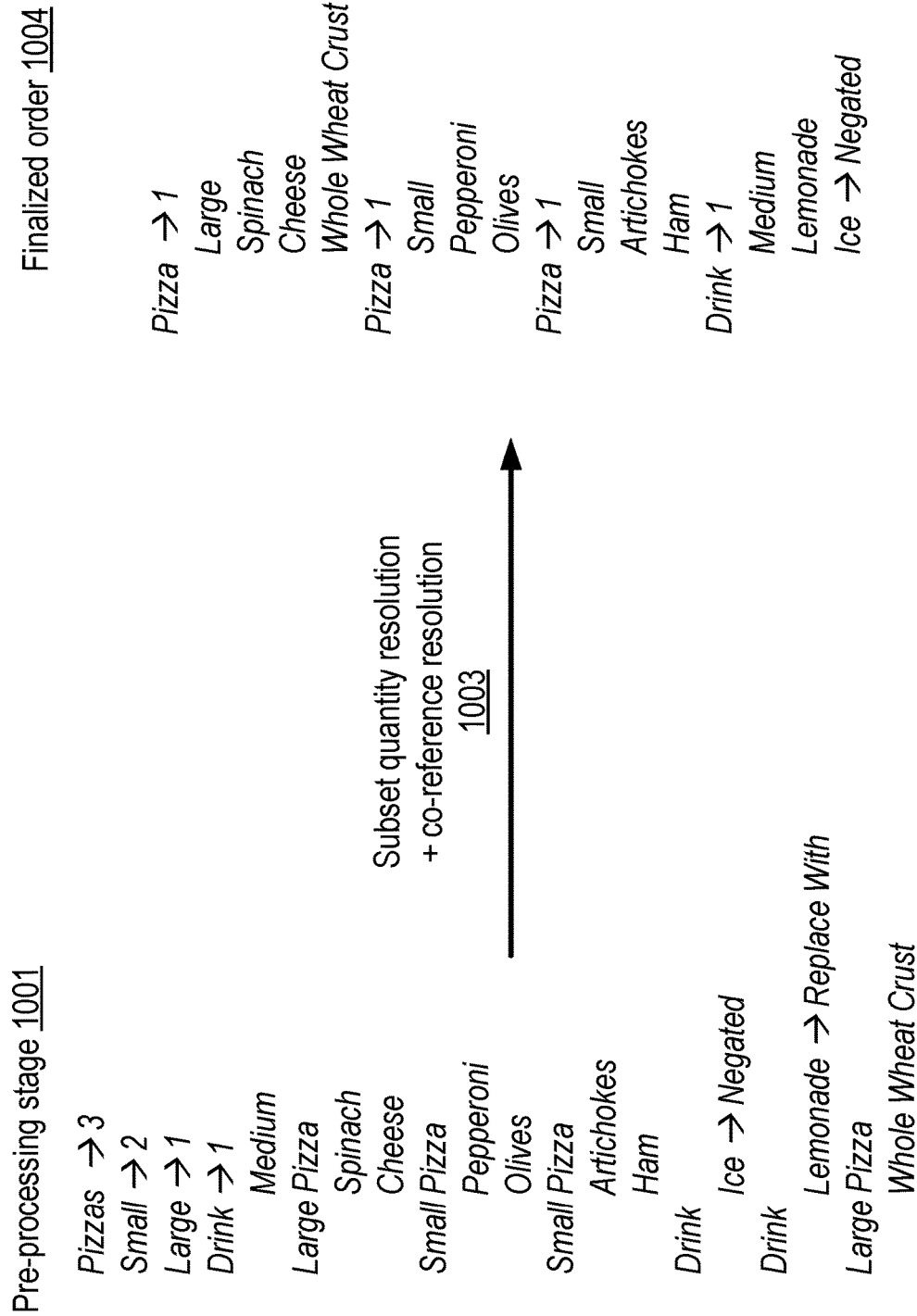
FIG. 10 illustrates an example of finalization of the fields of an order using subset quantity resolution and co-reference resolution, according to at least some embodiments.

FIG. 10 illustrates an example of finalization of the fields of an order using subset quantity resolution and co-reference resolution, according to at least some embodiments. In a pre-processing stage 1001 of the tasks performed using machine learning models, mentions of concepts may be recognized and labeled, relationships among the concepts may be extracted, potential co-reference clusters or groups may be identified, and quantity information may be determined as indicated in FIG. 8 and FIG. 9. The output of such a pre-processing stage, which in effect summarizes and re-orders the information indicated in the labels depicted in FIG. 8 and FIG. 9 is shown on the left side of FIG. 10.

Subset quantity resolution and co-reference resolution 1003 may then be performed on the pre-processing stage output, resulting in filled-out finalized order 1004. The information pertaining to a given menu item, spread initially across several different parts of the user input (such as "Drink→1", "Drink: Ice→Negated" and "Drink: Lemonade→Replace with", all of which provide information about the same drink item" may be combined in these steps of order finalization. In scenarios in which information about the total quantity of an item (e.g., "Pizzas→3") is provided in one part of the user's input, and then further information about sub-quantities of that total quantity are provided elsewhere, the subset quantities of the item may be reconciled with the total, making sure that all the items are accounted for. The finalized order 1004 shows that the inferred order comprises four primary or top-level menu items, three pizzas and a drink, and comprises details about hierarchically-related (e.g., added-on) second-level menu items for the appropriate primary menu items. Fields of an order data structure may be populated based on the inferences obtained from the machine learning models, and the order data structure may be transmitted to one or more order fulfilment components in various embodiments. According to some embodiments, the kinds of information presented in FIG. 8, FIG. 9 and/or FIG. 10, indicating intermediary processing operations at various stages of the order processing, may be provided to a client of a DOMS in response to programmatic requests. Such information may, if desired, be used to debug the functionality of the service, for example.

Methods for Dialog-Drive Order Acquisition

Figure 11:
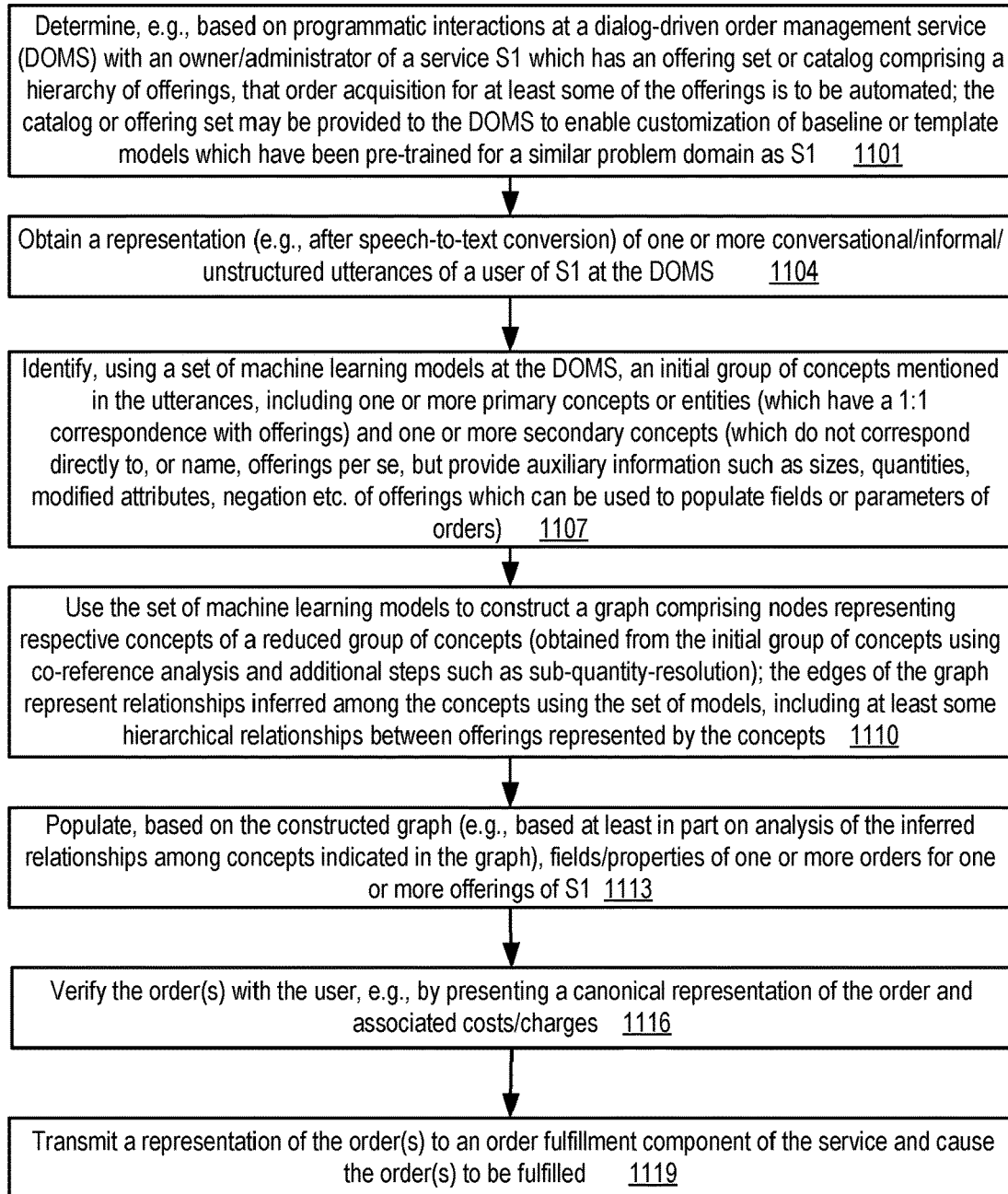
FIG. 11 is a flow diagram illustrating aspects of operations that may be performed at a dialog-driven order management service for acquisition of customer orders, according to at least some embodiments.

FIG. 11 is a flow diagram illustrating aspects of operations that may be performed at a dialog-driven order management service for acquisition of customer orders, according to at least some embodiments. As shown in element 1101, a determination may be made, e.g., based on one or more programmatic interactions between a dialog-driven order management service (DOMS) and an owner or administrator of a service S1 which has an offering set or catalog comprising a hierarchy of offerings, that order acquisition for at least some of the offerings of S1 is to be automated using the DOMS. A number of resources for executing machine learning models for the analysis and acquisition of the orders may be assigned or allocated for S1 in some embodiments in advance; in other embodiments, at least some of the resources may be acquired dynamically as needed. In at least some embodiments, the DOMS (which may be similar in features and functionality to DOMS 102 of FIG. 1) may have pre-trained a fleet of baseline machine learning models for order acquisition tasks such as concept recognition, co-reference resolution, relationship extraction and the like for various problem domains such as restaurant orders, retail store orders, and the like. Such baseline models may be customized based on the contents of the S1 catalog of offerings (and/or other custom information, such as examples of orders commonly received at S1) in at least some embodiments; that is, the S1 owner or administrator may provide information specific to S1 which can be used to improve or adapt the baseline models for S1-specific orders. In one embodiment, the DOMS may comprise training data synthesis tools which can create customized training examples based on the information provided.

A representation of one or more conversational utterances of a user of S1 may be obtained at the DOMS in the depicted embodiment (element 1104). In some embodiments, the representation may comprise text that has been derived from the user's verbal or speech utterances, e.g., using automated speech recognition (ASR) tools or models and/or other speech-to-text conversion techniques. In one embodiment, the original utterances of the user may comprise a mix of voice, text, DTMF and/or other signals, or may comprise only text (in which case conversion to the text representation may not be required). The utterances may be deemed conversational, informal or unstructured in that the DOMS may not require the user to specify the information about their desired items in a regimented or highly constrained manner.

The representation of the utterances may be provided as input to a set of one or more machine learning models (such as those discussed in the context of FIG. 3) at the DOMS in various embodiments. Using the models, an initial group of concepts mentioned in the utterances may be identified (element 1107). Some of the concepts may have a 1:1 correspondence with individual items or offerings of the S1 catalog, and may be referred to as primary concepts. Other concepts may be referred to as secondary or auxiliary concepts, in that they may not correspond directly to menu items, but may provide information such as sizes, quantities, modified attributes, negation etc. with respect to the primary concepts, which can collectively be used to populate fields or parameters of orders directed at S1. In some embodiments, some offerings or items may be identified from a user's utterances, e.g., using entity resolution models or synonym-based recognition models, despite that fact that the language utilized by the user does not match the language in the catalog or offering set exactly.

In at least some embodiments, a multi-step procedure for constructing a reduced graph from the identified concepts may be implemented. Initially, a preliminary graph whose nodes correspond closely to all or most of the concepts identified from the utterances may be constructed; the edges of the graph may represented relationships inferred, using the set of one or more models, among the concepts, including at least some hierarchical (e.g., is-added-on or parent-child) relationships in some embodiments. Then, using co-reference analysis techniques (e.g., co-reference detection followed by co-reference resolution) as well as other operations such as sub-quantity resolution (in which a total count of a particular offering, mentioned in the utterances, may be mapped to subsets of the total count, also mentioned elsewhere in the utterances) implemented using the machine learning models, a reduced or simplified version of the preliminary graph may be generated (element 1110). Note that in some cases, depending on whether co-references are resolved and/or depending on whether quantities of offerings are successfully mapped into sub-quantities via sub-quantity resolution, the reduced version of the graph may be no smaller than the preliminary version.

Based at least partly on the constructed graph (e.g., based on an analysis of the inferred relationships among the concepts which are represented in the graph), fields or properties of one or more data structures corresponding to orders for one or more offerings of S1 may be populated in the depicted embodiment (element 1113). For example, two offerings which are part of the same hierarchy, e.g., with one being added on to the other, may be included in an order in some cases. A number of other types of machine learning algorithms or models of the kinds mentioned earlier (e.g., in the context of the discussion of FIG. 3) may be used in different embodiments to fill out the orders in some embodiments, including for example entity resolution or entity linking models, contextual interpretation models, dialog completion models, dialog state management models, ASR models and the like.

In at least some embodiments, the order(s) may be verified with the user by the DOMS, e.g., by presenting a canonical or standardized version of the order and associated costs/charges (element 1116). If the user approves, a representation of the order(s) may be transmitted to an order fulfillment component of the service and the order(s) may be fulfilled (element 1119).

Example Multi-Tier System Implementing Automated Restaurant Order Management

Figure 12:
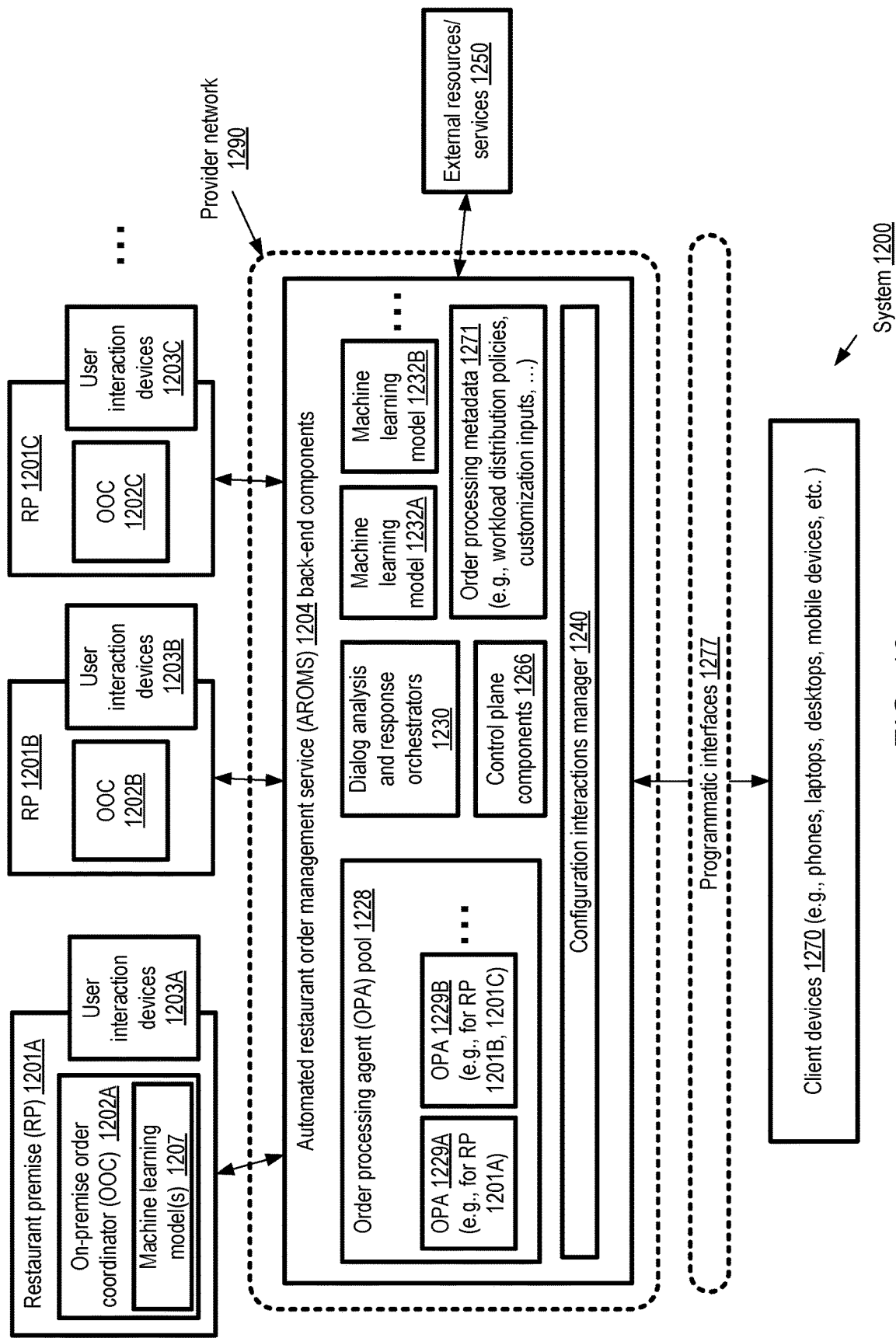
FIG. 12 illustrates an example system environment in which a multi-tier automated restaurant order management service utilizing collaborating resources located at restaurant premises and provider network data centers may be implemented, according to at least some embodiments.

FIG. 12 illustrates an example system environment in which a multi-tier automated restaurant order management service utilizing collaborating resources located at restaurant premises and provider network data centers may be implemented, according to at least some embodiments. As shown, system 1200 includes back-end components of a dialog-driven automated restaurant order management service (AROMS) 1204 located at one or more data centers of a provider network 1290, as well as on-premise order coordinators (OOCs) of the AROMS which are executed at restaurant premises (RPs) 1201. A given restaurant premise (which be a fixed-location or brick-and-mortar entity, or a moveable entity such as a food truck or kiosk) may comprise a network of devices (e.g., user interaction devices 1203 such as microphones, speakers, touch screens, customer presence detection devices such as cameras and other automobile detectors) and connected software components of the AROMS (including the OOCs and associated machine learning models 1207, a database indicating the currently-available supply of various ingredients at the premise, and/or other types of programs) in the depicted embodiment.

The AROMS may represent an extension or customization of a dialog-driven order management (DOMS) of the kind discussed earlier to the problem domain of managing restaurant orders with varying local computing capabilities at the restaurant premises. Some restaurant premises may have sufficient computing capabilities, such as desktop, laptop and/or mobile devices, to run at least a subset of the machine learning tasks (e.g., automated speech recognition, hierarchical concept recognition, co-reference resolution, relationship extraction etc.) needed to populate order contents based on conversational input, while relying on provider network resources to perform the remaining machine learning tasks. Other restaurant premises may typically rely on the provider network components to perform the bulk of the analysis for order acquisition, while providing detected user utterances and/or local order fulfilment capabilities to the provider network. A variety of static or dynamic workload distribution policies comprising rules which indicate where (i.e., at the prover network, or at resources external to the provider network) machine learning tasks for order acquisition are to be performed for a given restaurant premise may be enforced at the AROMS at the request of restaurant owners or managers in the depicted embodiment.

In various embodiments, the AROMS may implement a set of programmatic interfaces 1277, such as web-based consoles, graphical user interfaces, command-line tools, application programming interfaces and the like. Such interfaces may be used by clients of the AROMS such as restaurant owners or managers to submit various types of requests, preferences and other messages pertaining to order processing for their restaurants to the AROMS from client devices 1270 (e.g., phones, laptops, desktops, mobile devices and the like), and to receive corresponding responses. The client messages may be parsed initially at a configuration interactions manager 1240, which may in turn pass on internal versions of the messages to other components of the DOMS such as control plane components 1266 responsible for configuration-related tasks such as assignment of order processing agents to individual restaurant premises in the depicted embodiment.

In at least some embodiments, the AROMS may obtain an indication of a restaurant premise (RP) 1201 (such as RP 1201A, 1201B or 1201C) for which order processing is to be automated in a registration request submitted via programmatic interfaces 1277. Information about the premise (such as a descriptor of the types of computing devices and user interaction devices available at the premise) may be stored in order processing metadata 1271 in some embodiments. A policy for distributing various categories of machine learning tasks pertaining to restaurant orders expressed using informal conversational interactions (such as utterance detection, user intent identification and order parameter population) among an on-premise order coordinator and a provider network resource of the order management service may be determined at the AROMS and stored in order processing metadata 1271 in the depicted embodiment. In some cases, the AROMS client may provide an indication of the workload distribution policy, while in other embodiments, the AROMS may select at least an initial workload distribution policy based for example on default settings or based on a descriptor of the computing capabilities of the restaurant premise. The machine learning tasks that are performed at the provider network or back end components of the AROMS in accordance with the workload distribution policies, e.g., using machine learning models 1232A and 1232B, may be coordinated by dialog analysis and response orchestrators 1230 in the depicted embodiment. Machine learning tasks that are performed at the restaurant premises 1201, e.g., using machine learning models 1207, may be orchestrated by the OOCs, such as OOC 1202A at RP 1201A, OOC 1202B at RP 1201B, and OOC 1202C at RP 1201C. In various embodiments, some or all of the kinds of machine learning techniques, model types and algorithms discussed in the context of FIG. 1-FIG. 11 may be employed at one or more of the layers/tiers of the AROMS.

Some workload distribution policies may comprise conditional rules, indicating for example that the decision as to where models for a particular type of machine learning task should be run for a given set of one or more user utterances is to be made based on a communication mode or channel (e.g., voice mode versus text/DTMF mode) being utilized by the end user. Another such conditional rule may indicate that such a decision should be made based at least in part on performance criteria. For example, if the network latencies between an OOC and the AROMS back end exceeds a threshold, a conditional rule may indicate that a particular type of task should be conducted using a local model at the restaurant premise. In another example, if the utilization metrics of one or more resources of the computing devices used for an OOC exceed a threshold during some recent time interval while latencies to the provider network remain small, another type of machine learning task may be performed at the provider network.

In some embodiments, depending on the computing capabilities of the RPs, the same types of machine learning models may be executed at either the provider network or at the RPs for a given type of task; in other embodiments, simpler versions of machine learning models for a given type of task (which utilize fewer computing resources) may be used at RPs than at the provider network. In at least some embodiments, the AROMS may implement a phone-based application, an application which runs on voice-enabled personal assistance devices, wearable computing devices, augmented reality/virtual reality devices and the like, which can be used by restaurant customers to provide conversation-based orders; in at least one embodiment, some of the machine learning tasks related to order processing may also be performed at such client-side devices (e.g., functionality similar to that of the OOCs may be performed at the client-side devices).

According to the workload distribution policy in effect for a given RP 1201, at least a portion of an utterance (e.g., a vocal utterance or an utterance indicated in text form or using DTMF) of a user or customer of a restaurant premise may be analyzed at an OOC 1202. The OOC may then transmit an indication of a restaurant menu item detected in the utterance, as well as an indication of an available supply of the menu item, to one of the resources of the provider network portion of the AROMS in various embodiments. In at least one embodiment, the restaurant menu item may be detected based on analysis performed at the provider network portion of the AROMS, and the OOC may be informed about the item by the AROMS back-end, after which the OOC may send the information about the available supply to the AROMS back end. In some embodiments, for each restaurant premise registered at the AROMS for automated order management, a respective order processing agent (OPA) 1229 may be allocated from a pool 1228 of OPAs, e.g., by control plane components 1226. Individual OPAs may for example comprise respective threads of execution within an operating system, or respective processes within an operating system, which communicate with OOCs and with other components of the AROMS back-end on behalf of the OOCs. In the example scenario depicted in FIG. 12, OPA 1229A may be assigned to RP 1201A's OOC 1202A, while OPA 1229B may be assigned to RP 1201B's OOC 1202B as well as RP 1201C's OOC 1202C.

The utterance analysis result and available supply information transmitted by an OOC 1202 may be received at an OPA 1229 and forwarded on to a dialog analysis and response orchestrator 1230 in various embodiments. The orchestrator 1230 may analyze this transferred information using or more machine learning models 1232 and prepare or compose contents of a response utterance in at least some embodiments. The response utterance contents (e.g., a sequence of words or tokens asking questions about an ordered menu item) may be transmitted to the OOC 1202 by the OPA 1229 in some embodiments. At the RP 1201 at which the OOC 1202 runs, the response utterance may be presented to the user (whose earlier utterance was analyzed at least in part by the OOC 1202) via one of the user interaction devices 1203 (such as user interaction devices 1203A, 1203B or 1203C) in the depicted embodiment.

The user may in turn respond to the AROMS utterance with a new utterance, and this type of back-and-forth interaction sequence may continue until the AROMS has determined all the information needed to fill out the fields of the user's order. After the order has been finalized (and optionally verified by the user), the OOC 1202 may cause the order to be fulfilled at the RP in the depicted embodiment. Respective parameters of the order may be fulfilled based on analysis of different utterances of the user—e.g., a primary menu item may be identified from one utterance, add-on items hierarchically related to the primary menu item may be identified from other utterances detected after automated responses to earlier user utterances were provided, and so on. Hierarchical concept recognition for orders, including the detection of primary and auxiliary concepts of the kind introduced earlier, co-reference analysis with respect to such concepts, relationship extraction and so on may be performed in various embodiments using the kinds of models discussed in the context of FIG. 3. Individual ones of the back-end AROMS components and the on-premise components may comprise hardware and/or software of one or more computing devices in various embodiments. In some cases, resources 1250 external to the provider network and the RPs may be utilized to fulfil some orders in the depicted embodiment—for example, a restaurant owner may require that log records of restaurant orders have to be saved at a third-party repository before the orders are fulfilled, or that respective records be stored for each order at a database maintained at a data center of the restaurant owner.

According to at least some embodiments, clients of the AROMS may provide their restaurant menus (which may in some cases differ from one premise to another, even if the two premises are owned by the same entity) and/or other customization data sets to the AROMS, enabling the machine learning models 1232 and/or 1207 to be customized for each premise using an approach similar to that shown in FIG. 4. Models at both the provider network resources and the RPs may be customized in some embodiments.

In some embodiments, a set of escalation criteria for a given restaurant premise may be determined, e.g., based on input provided by an AROMS client and/or based on defaults or heuristics of the AROMS. Such criteria may be used to determine, e.g., by the OOC, when a manual intervention or action may be required for a particular customer of the restaurant, and an employee of the restaurant may be notified to participate in the subsequent interactions with the customer. Such escalation could be based on results obtained from sentiment analysis machine learning models (e.g., among models 1232 or 1207) which can infer user dissatisfaction levels. If a customer has repeatedly provided similar input without being understood accurately by the AROMS, e.g., in response to a similar query repeated by the AROMS, the user may get frustrated (with the frustration being detected using the sentiment analysis models) and manual intervention may be appropriate in some embodiments. Escalation may also be triggered in some embodiments based on determining that a confidence level associated with an output of a machine learning model 1232 or 1207 is below a threshold, based on detection of looping dialog exchanges (in which the same question which was asked earlier by the AROMS has to be asked repeatedly), and/or based on other factors.

According to some embodiments, at least a portion of a response generated automatically by the AROMS to a user utterance associated with a restaurant may be determined based on a dialog customization policy indicated by the AROMS client on whose behalf the user's utterance is analyzed. Such a dialog customization policy may indicate, for example, a discount offer associated with one or more menu items of the restaurant which could be mentioned in the response. A dialog customization policy may indicate regulation-required information to be provided to restaurant customers (such as information about health risks associated with eating or drinking certain items) in some embodiments. Actions to be initiated in response to determining that a result produced by a machine learning model with respect to a user utterance does not satisfy a validity criterion (e.g., if the user utterance appears to be nonsensical or logically inconsistent), such as escalations to restaurant employees, may also be indicated in such customization policies, and the actions may be initiated by the OOCs and/or the back-end AROMS components in various embodiments.

In at least one embodiment, the back-end AROMS components may include analyzers (e.g., additional machine learning models) of the placement of interaction devices at the restaurant premises. Input to such models may comprise a description of the current locations or positioning of interaction devices such as microphones, speakers, touch screens and the like at a restaurant premise. Analysis of the captured sound quality of numerous utterances of end users and/or the AROMS-composed response utterances using such models may be used to generate recommendations for changes to the physical placement of one or more of the interaction devices at the restaurant. For example, recommendation to move a microphone closer to the typical location of a car driver in a drive-through lane, or further away from a speaker used for outbound communications with users to reduce the probability of feedback, may be provided to the restaurant owner/manager in some embodiments.

Example Restaurant-Premise Network

Figure 13:
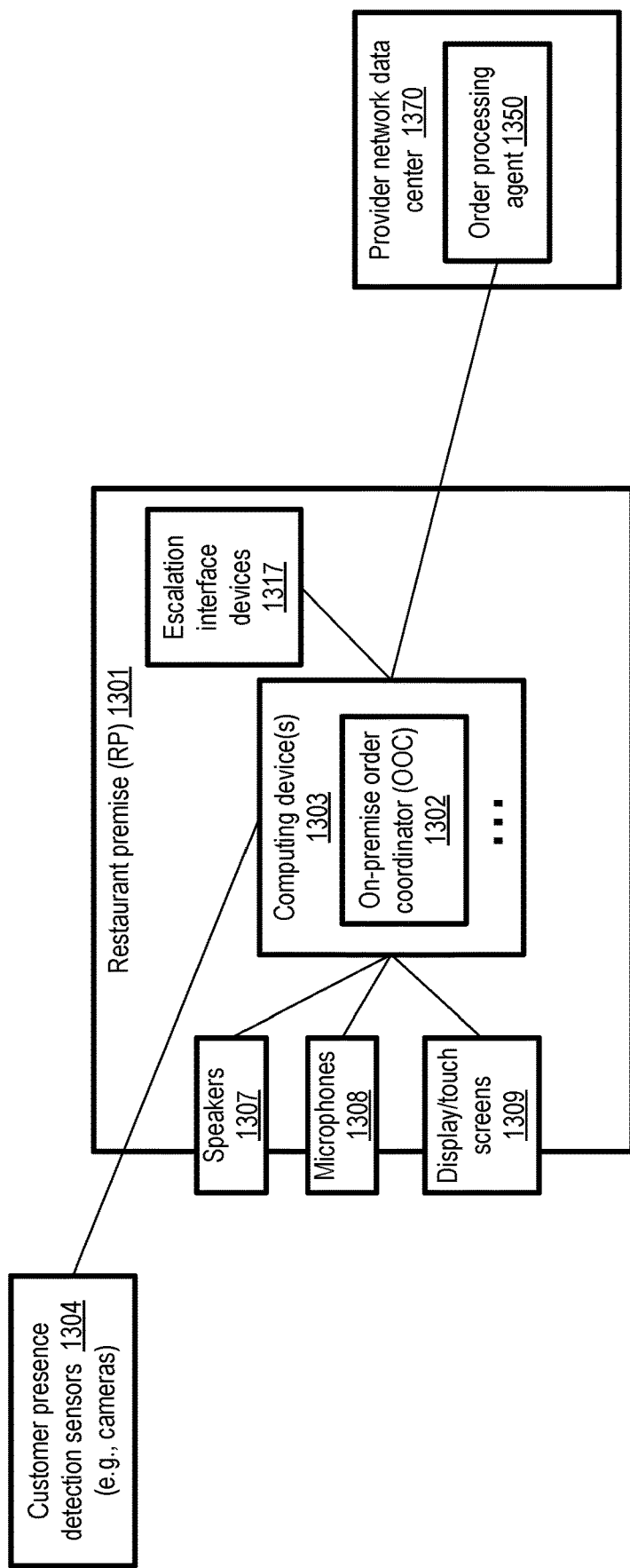
FIG. 13 illustrates an example set of connected devices at a restaurant premise which may interact with a dialog-driven restaurant order management premise, according to at least some embodiments.

FIG. 13 illustrates an example set of connected devices at a restaurant premise which may interact with a dialog-driven restaurant order management premise, according to at least some embodiments. Restaurant premise 1301 may include one or more computing devices 1303 (e.g., desktop, laptop or tablet computers) at which an on-premise order coordinator (OOC) comprising one or more processes or threads may be executed in the depicted embodiment. Other software components involved in order processing and administration of the order processing tasks may also be executed at the computing devices in some embodiments as discussed below in the context of FIG. 14.

The computing devices 1303 may be linked via wireless or wired connections to a variety of devices used for direct interactions with restaurant customers or users, such as a set of speakers 1307, microphones 1308, and/or display/touch screens 1309 in the depicted embodiment. The computing devices may also be linked to one or more customer presence detection sensors 1304 (e.g., sensors such as cameras which detect the presence of automobiles in the drive-through portion of a restaurant, or the presence of a pedestrian near a window used for placing in-person orders). The detection of the presence of a customer (such as in a vehicle in a drive-through lane) may, for example, cause a communication analyzer machine learning model to be activated by an OOC 1302 to listen for customer utterance initiation and to start analyzing the contents of such utterances in some embodiments; during periods in which no customer is detected, such communication analyzers may remain dormant or inactive.

In at least some embodiments, the OOC may also be linked to one or more escalation device interfaces 1317, such as pagers or other notification device interfaces which can be used to alert a restaurant employee that in-person intervention is required in the interactions with a restaurant customer. The OOC may also interact with an order processing agent 1350 executing at a provider network data center 1370 in the depicted embodiment. The network of devices at a restaurant premise 1301, as well as the back-end components of the AROMS implemented at the provider network data centers may all work together seamlessly to accurately determine the contents orders of restaurant customers based on conversational input in the depicted embodiment.

In at least some embodiments, restaurant customers may not necessarily have to be physically present at the restaurant to place orders (e.g., by speaking into speakers 1307, providing touch signals using display/touch screens 1309, or and listening for responses via speakers 1307). Instead, customers may be able to provide conversational input (and receive conversational responses) via a phone, a portable computing device, a wearable device or a voice-driven personal assistant device, for example. In some embodiments, a web application, a phone application or some other type of program provided by the AROMS and installed at such client-side devices may be used for the user interactions, and/or to execute at least a subset of the machine learning models utilized for order analysis.

Example Software at Restaurant Premise

Figure 14:
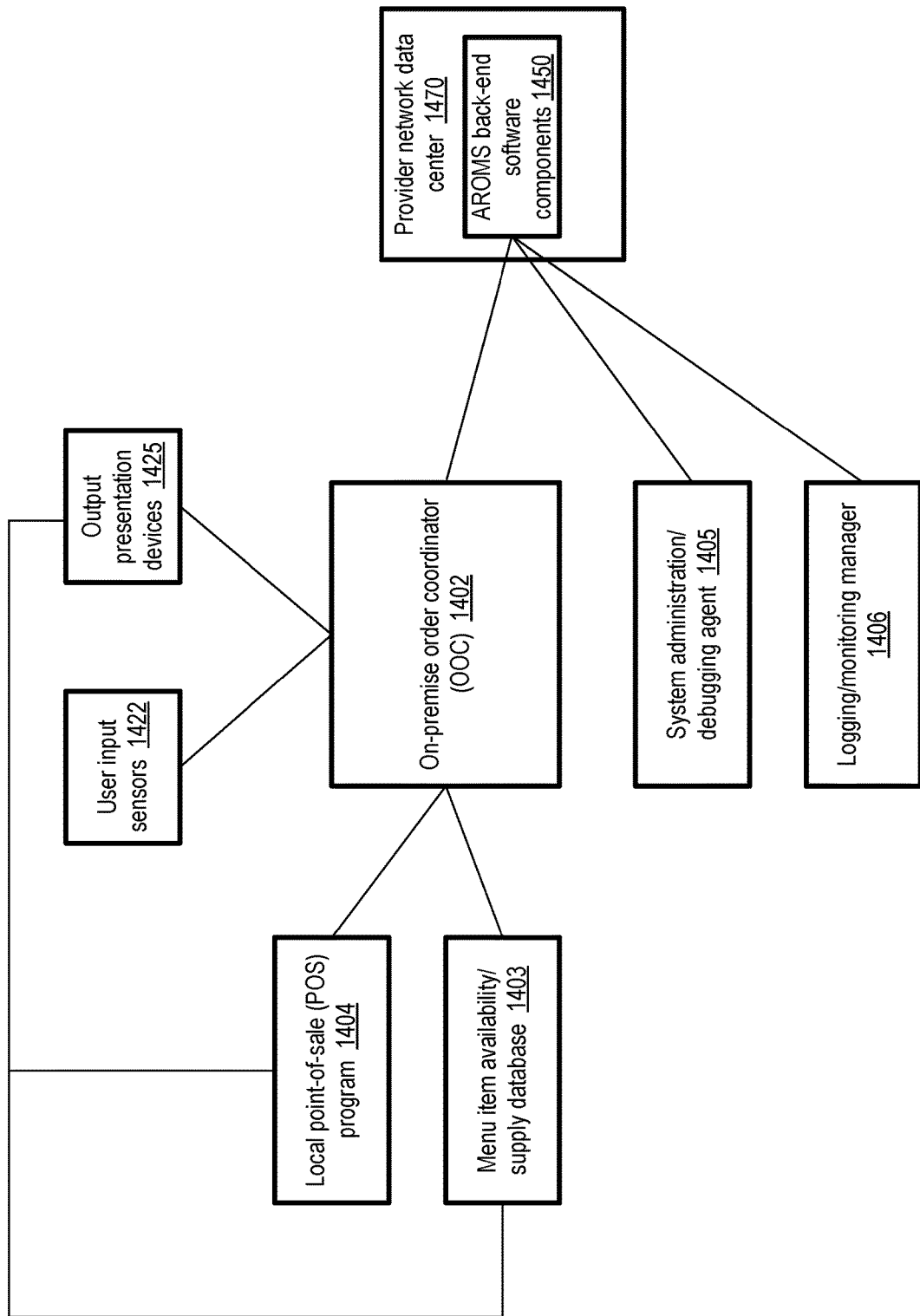
FIG. 14 illustrates an example set of software programs which may be executed at a restaurant premise for managing orders in collaboration with back-end resources of a dialog-driven restaurant order management service, according to at least some embodiments.

FIG. 14 illustrates an example set of software programs which may be executed at a restaurant premise for managing orders in collaboration with back-end resources of a dialog-driven restaurant order management service, according to at least some embodiments. An on-premise order coordinator (OOC) 1402 may for example comprise one or more processes or threads of one or more programs, running at a computing device located at a restaurant premise. An OOC may run one or more machine learning models for order analysis and acquisition locally at the restaurant premise in some embodiments as indicated earlier. The OOC 1402 may communicate with software at user input sensors 1422 (e.g., one or more microphones or touch screens), e.g., to receive detected utterances of restaurant customers, as well as software at output presentation devices 1425 (e.g., speakers or touch screens) used for presenting AROMS-generated response utterances to the customers in the depicted embodiment. In some embodiments, software at the user input sensors may convert speech to text, while software at output presentation devices may convert text to speech.

A menu item availability/supply database 1403 may be used to keep track of the ingredients needed for fulfilling orders at the restaurant premise in at least some embodiments. In the depicted embodiment, information conveyed by the OOC to the AROMS back-end software components 1450 running at provider network data centers 1470 (such as order processing agents of the kind discussed above) may include information about the availability of ingredients or supplies at the premise, so that responses generated at the back end may be able to assess the feasibility of fulfilling the customer's order, and prepare the appropriate response utterances accordingly. For example, if analysis of a customer's utterance (performed at the OOC itself, at the provider network, or using resources at both locations) indicates that an ingredient I1 is needed to fulfill the order, but the restaurant premise has run out if I1, a different type of response utterance (e.g., including the equivalent of "We're sorry, we have just run out of that ingredient") may be prepared at the AROMAS back end than if a sufficient supply of I1 is available (in which case the response utterance may include the equivalent of "Would you like anything else in addition to I1?"). The database 1403 may be kept up to date by restaurant employees as more ingredients and/or supplies are consumed in various embodiments. In some embodiments, instead of just providing information about available ingredients, more general information about the current order fulfillment capabilities for various types of items (e.g., oven space for menu items which require ovens, etc.) may be provided to the AROMS back end by the OOC and used to tailor the contents of response utterances produced/composed by machine learning models. In some embodiments, the menu item availability information obtained dynamically from database 1403 may be used to present information proactively via some output presentation devices 1425 (such as touch screens which may indicate that the restaurant premise has run out of some extremely popular item, even before the customer has started conversational interactions with the on-premise components of the AROMS.

Local point-of-sale (POS) programs 1404 may also be linked to the OOC 1402 and the output presentation devices 1425 in the depicted embodiment. Such programs may, for example, perform billing related computations and present information about the total cost of an order to customers.

According to at least some embodiments, a system administration or debugging agent 1405 may also be executed at a restaurant premise, e.g., at the computing devices which may be employed for the OOC 1402. Such an agent may be used, for example, by trained technicians at remote locations (e.g., at a headquarters of a restaurant enterprise which has many different restaurant locations, or at provider network data centers) to debug problem situations with respect to the software or hardware being used at the restaurant premise. A logging/monitoring manager 1406 may capture and transmit log messages and/or performance metrics from the on-premise components of the AROMS to the back end components, where they may be analyzed offline, for example, to determine whether any configuration changes in the set of AROMS components should be made to improve customer experiences in some embodiments. Other types of software, not shown in FIG. 14, may also be deployed at restaurant premises for automated order management in some embodiments.

Example Machine Learning Models Used for Restaurant Order Management

Figure 15:
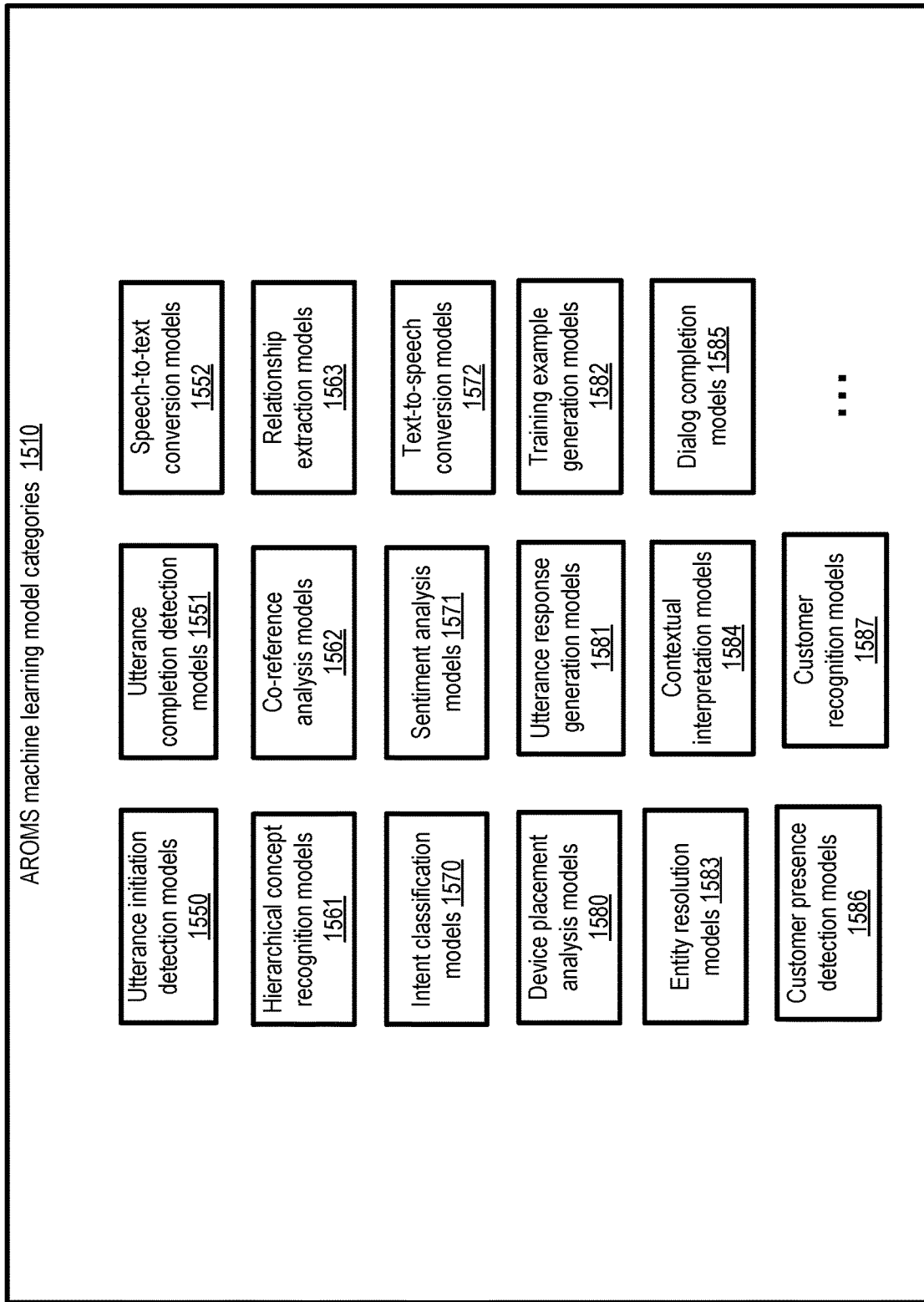
FIG. 15 illustrates an example set of machine learning models which may be utilized for dialog-driven restaurant order management, according to at least some embodiments.

FIG. 15 illustrates an example set of machine learning models which may be utilized for dialog-driven restaurant order management, according to at least some embodiments. As discussed above, an automated restaurant order management service (AROMS) similar in features and functionality to AROMS 1204 of FIG. 12 may utilize resources within a provider network, as well as resources external to the provider network, to perform various machine learning tasks for restaurant order processing. The distribution of machine learning work between provider network-based resources and external resources (e.g., computing devices located at restaurant premises and/or restaurant customers' devices such as phones, tablets, voice-driven personal assistant devices and the like) may differ based on the specific needs of restaurant owners/managers, the capabilities of the computing devices available outside the provider network, the health of network connectivity between the provider network and a restaurant premise, and so on.

AROMS machine learning model categories 1510 may include, among others, utterance initiation detection models 1550 utterance completion detection models 1551, speech-to-text conversion models 1552, hierarchical concept recognition models 1561, co-reference analysis models 1562, relationship extraction models 1563, intent classification models 1570, sentiment analysis models 1571, text-to-speech conversion models 1572, device placement analysis models 1580, utterance response generator models 1581, training example generation models 1582, entity resolution models 1583, contextual interpretation models 1584, dialog completion models 1585, customer presence detection models 1586, customer recognition models 1587, and the like. In some embodiments, respective versions of some or all of these models may be incorporated at a restaurant premise, at provider network resources, and/or at restaurant customer devices such as phones, tablets and the like. For example, for speech-to-text conversion, model STCM-PN (speech-to-text conversion model-provider network version) may be executed at the provider network, model STCM-RP may be executed at a resource at a restaurant premise, and model STCM-CD may be executed at a customer device. In some cases, the versions of the model at the different tiers of the AROMS may differ in their capabilities and resource requirements—e.g., STCM-PN may tend to provide more accurate conversions of speech, and consume more computing resources than, STCM-RP, and STCM-RP in turn may tend to provide more accurate conversions of speech, and consume more computing resources than STCM-CD. In other cases, models with the same capabilities may be used at any of the locations for a given type of machine learning task. In at least one implementation, some types of machine learning models shown in FIG. 15 may only be run at a subset of the tiers of an AROMS—e.g., training example generation models 1582 may only be run at the provider network tier.

Utterance initiation detection models 1550 may be employed to detect when a customer of the restaurant starts speaking (or providing conversational input in other modes) in various embodiments. Utterance completion detection models 1551 may detect when an utterance is complete (e.g., when a threshold amount of time in which the customer has remained silent has elapsed) in the depicted embodiment. Speech-to-text conversion models 1552, also referred to as automated speech recognition (ASR) models, may map the sounds produced during an utterance into words or tokens in various embodiments. The words or tokens may be analyzed using a combination of models similar to those discussed in the context of FIG. 3 in some embodiments: hierarchical concept recognition models 1561, co-reference analysis models 1562, and relationship extraction models 1563. Intent classification models 1570 may be used to map the concepts to individual menu items of the menu of the restaurant in some embodiments, in effect to identify the intents or purposes of the user's utterances.

Sentiment analysis models 1571 may be used to infer whether the customer is dissatisfied in some embodiments with a set of automated interactions with the AROMS, and to potentially initiate escalation actions which lead to the participation of restaurant employed in the conversation with the customer in at least one embodiment. Utterance response generator models 1581 may construct the sequences of words which are to be spoken (or otherwise conveyed, depending on the mode of communication being used by the customer) to the customer in response to the customer's utterances, while text-to-speech conversion models 1572 may transform such sequences into speech if needed in the depicted embodiment. Device placement analysis models 1580 may be used in some embodiments to analyze the physical configuration of customer interaction devices (such as speakers, microphones and the like) at a restaurant premise, e.g., using captured acoustic quality information pertaining to user utterances and response utterances, and generate recommendations for re-arranging/modifying the placement of devices as needed to improve customer experience in some embodiments. In various embodiments, training example generation models 1582 may be used to customize baseline models for tasks such as concept recognition, co-reference analysis, relationship extraction and the like based on restaurant-specific menus and/or other customization metadata provided by restaurant owners/managers.

In some embodiments, entity resolution models 1583 (e.g., models which are able to infer a mention of a menu item in a user's utterances even though the terms in the utterance do not match the menu's terminology exactly), contextual interpretation models 1584 (e.g., models which are able to map the same term or phrase to different menu items based on the context in which the term or phrase is used) and/or dialog completion models 1585 (which ensure that dialog components needed to obtain values for all expected parameters of an order are presented to the end users) may also be among the categories of models employed at an AROMS. Additional discussion of entity resolution models, contextual interpretation models and dialog completion models is provided above in the context of FIG. 3. In one embodiment, one or more customer presence detection models 1586 may be employed at an AROMS, e.g., to detect when a customer vehicle (or a customer who is not using a vehicle) approaches a restaurant premise; when such a customer's approach is detected using such a model, one or more other machine learning models may be activated to start listening for utterances. In some embodiments, in addition to simply detecting whether some customer is in a position to provide a dialog-based order, one or more machine learning models may be used to recognize the customer (e.g., as a repeat customer). Such customer recognition models 1587 may be used, for example, to proactively populate some parameters/elements of an order based on earlier orders of the recognized customer (e.g., based on repeated preferences indicated by the customer in the past). Note that while several of the model categories 1510 are focused on analysis and inferences pertaining to language, others (such as customer presence detection models 1586 and customer recognition models 1587) may focus on inferences pertaining to other types of input signals such as images, videos and the like. Other combinations of machine learning models, not shown in FIG. 15, may be employed in different embodiments at one or more tiers of an AROMS.

Example Factors and Policies for Workload Distribution

Figure 16:
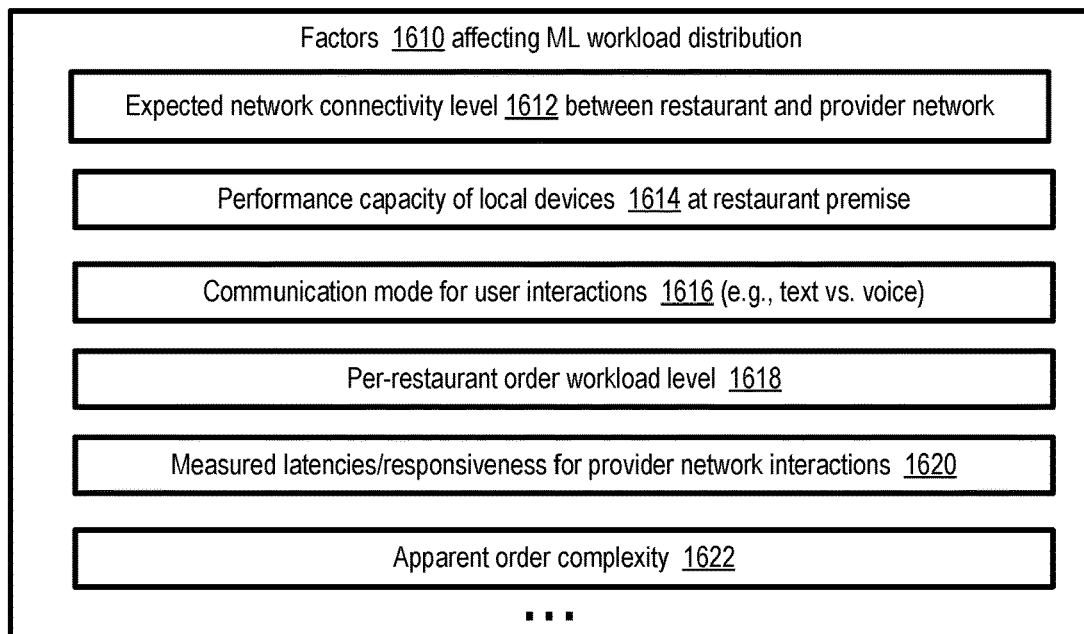
FIG. 16 illustrates example factors which may influence the distribution of order processing machine learning task workloads, as well as example policies which may be implemented for the distribution of such workloads, according to at least some embodiments.
Figure 16:
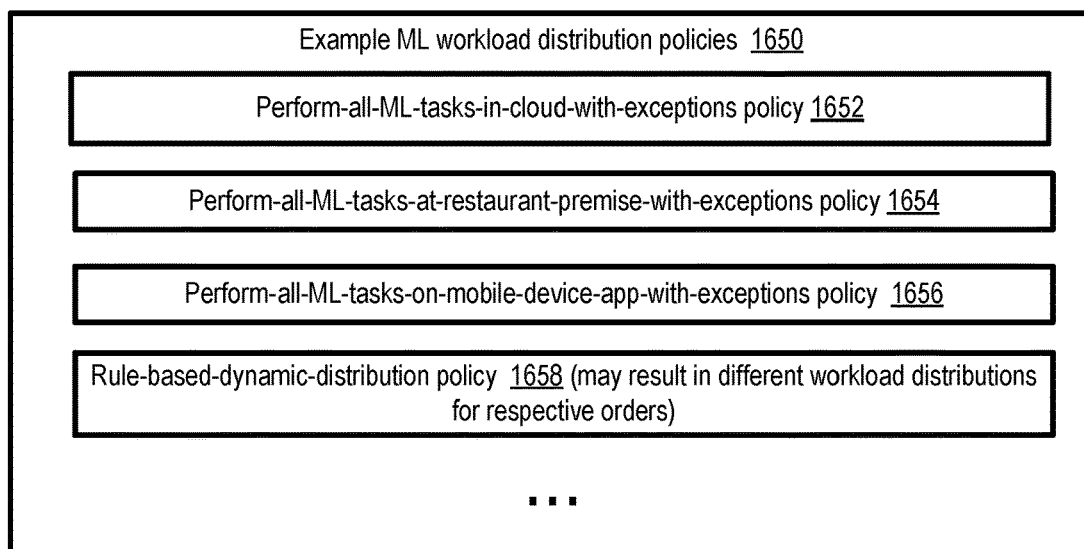

FIG. 16 illustrates example factors which may influence the distribution of order processing machine learning task workloads, as well as example policies which may be implemented for the distribution of such workloads, according to at least some embodiments. As shown, factors 1610 affecting machine learning workload distribution for automated order processing of a given restaurant or group of related restaurants (e.g., several restaurants owned by the same entity or person) may include the expected network connectivity level 1612 between a restaurant premise and the provider network in some embodiments. If the network connectivity is not strong, or if packets between the restaurant premise often get delayed or dropped, for example, a workload distribution policy that results in more machine learning tasks being performed at the restaurant premise may be preferred in some embodiments. The performance capacity of local devices 1614 at a restaurant premise may also influence the distribution of the workload—for example, if the restaurant has relatively low computing capacity, more of the machine learning tasks for order processing may be performed at the provider network in at least some embodiments.

The communication mode 1616 used by a restaurant customer for a particular interaction (e.g., text versus voice) may influence workload distribution in some embodiments. For example, voice input may at least in some cases be harder to interpret than text-based messages, so processing of voice utterances may preferentially be performed in some embodiments using more powerful computing resources of a provider network, while processing of text utterances may be performed using resources at restaurant premises. The per-restaurant order workload level 1618 may affect workload distribution in some embodiments—e.g., if a large number of conversational sessions are initiated by a given restaurant's customers at about the same time, this may potentially overload the computing resources of the restaurant, so at least some of the analysis of the conversations may preferentially be performed at the provider network.

Even if the overall connectivity level between the restaurant premise and the provider network is expected to be good, it may be the case that the latencies for message transfers between the premise and the provider network data centers vary from time to time, e.g., based on network path congestion and other factors. The measured latencies/responsiveness for provider network interactions 1620 from a restaurant premise may be used to dynamically modify the machine learning task workload distribution in some embodiments—e.g., as measured latencies increase, more tasks may be performed at the restaurant premises. The apparent complexity 1622 of a given customer order may influence the workload distribution in some embodiments. For example, an initial analysis of a customer's utterance(s), performed using machine learning models external to the provider network, may be used to estimate the complexity of the order that is likely to result from further analysis of the utterance(s). If the initial analysis suggests that the customer wishes to place a fairly complex order (e.g., with numerous menu items, customization and/or substitutions of default ingredients, etc.), the bulk of the remaining analysis may preferentially be performed at the provider network in some embodiments. If, in contrast, the initial analysis suggests a fairly straightforward order, resources at the restaurant premise may suffice for the acquisition of the order.

Example machine learning workload distribution policies 1650 for an AROMS which may be implemented in at least some embodiments may include a perform-all-ML-tasks-in-cloud-with-exceptions policy 1652, a perform-all-ML-tasks-at-restaurant-premise-with-exceptions policy 1654, a perform-all-ML-tasks-at-mobile-device-app-with-exceptions policy 1656, and a rule-based-dynamic-distribution policy 1658. In the case of policy 1652, the majority of machine learning tasks may be performed at the provider network, with the exception of a few (e.g., utterance initiation detection) which may be performed using resources external to the provider network. In contrast, in policy 1652, most of the machine learning tasks with a few exceptions may be performed at a restaurant premise, with the rest being performed at the provider network. In policy 1654, the majority of the machine learning tasks may be performed at an application installed at a mobile device. In rule-based-dynamic-distribution policy 1658, a client of the AROMS (such as a restaurant owner or manager) may indicate rules (e.g., based on communication modes selected by restaurant customers for utterances, measured restaurant premise to provider network latencies or resource consumption levels of resources at the restaurant premise) to be used to dynamically select the resources to be used for one or more types of machine learning tasks used for order processing. In scenarios in which rule-based-dynamic-distribution policies 1658 are employed, it may sometimes be the case that the workload distribution for one order directed to a restaurant may differ from the workload distribution of another order directed to the same restaurant shortly after the first order, as the conditions used in defining the rules may have changed since the utterances which led to the first order were analyzed. In at least one embodiment, decisions regarding where some machine learning tasks are to be performed for a given conversation may be made dynamically—e.g., for analysis of a first utterance of the conversation, models running at a restaurant premise may be used, while for analysis of subsequent utterances, provider network resources may be selected based on the dynamic rules, even if the initial decision was to perform all the tasks related to the conversation at the restaurant premise. Other types of policies, not shown in FIG. 16, which for example split the tasks relatively evenly between the provider network resources and external resources, may be used in some embodiments.

Example Programmatic Interactions

Figure 17:
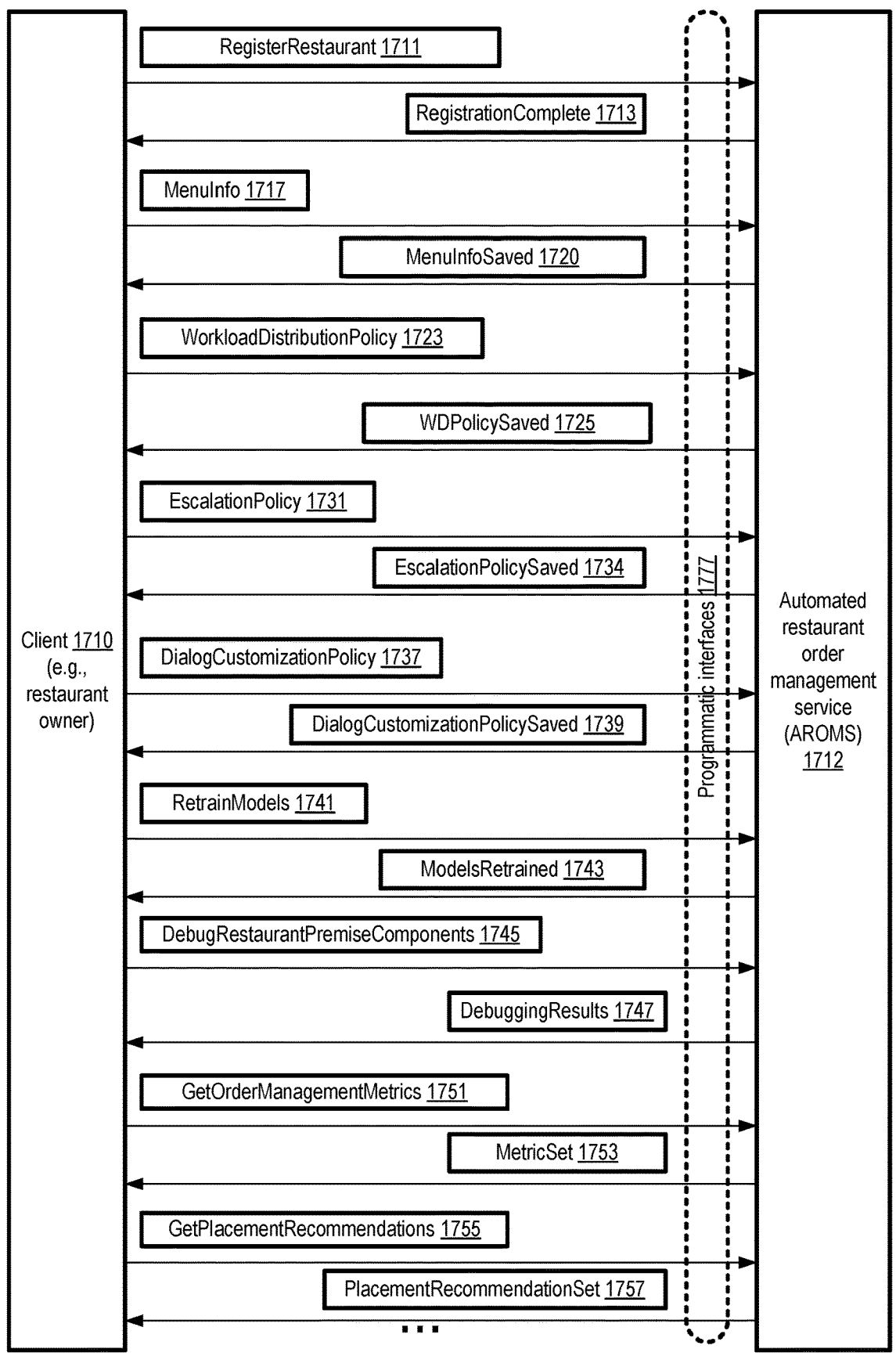
FIG. 17 illustrates an example set of programmatic interactions for configuring aspects of dialog-driven restaurant order management, according to at least some embodiments.

FIG. 17 illustrates an example set of programmatic interactions for configuring aspects of dialog-driven restaurant order management, according to at least some embodiments. In the depicted embodiment, an AROMS 1712, similar in features and functionality to AROMS 1204 of FIG. 12, may implement a set of programmatic interfaces 1777, such as web-based consoles, graphical user interfaces, command-line tools, APIs and the like. A client 1710 of the AROMS, such as a restaurant owner or manager, may use programmatic interfaces 1777 to submit configuration-related requests and other types of messages to the AROMS and receive corresponding responses.

A client 1710 may use programmatic interfaces 1777 to submit a RegisterRestaurant request 1711 indicating a particular restaurant premise whose orders are to be automated in the depicted embodiment. Metadata pertaining to the restaurant premise (e.g., the types of computing devices and user interaction devices of the premise) may be included in the request, and saved at the AROMS 1712 before a RegistrationComplete message 1713 is sent back to the client to indicate that the specified premise has been registered. In some embodiments, on-premise software components (such as on-premise order coordinators of the kind discussed above) may be installed at one or more computing devices prior to the completion of the registration, and/or connectivity between the order coordinators and other components of the on-premise network may be verified.

The client 1710 may submit a MenuInfo message 1717 via interfaces 1777, indicating the contents of the menu of the registered restaurant in some embodiments, and this information may be used at the AROMS to customize a baseline set of machine learning models to be used for the orders of the registered restaurant, e.g., using techniques similar to those discussed above in the context of FIG. 4. A MenuInfoSaved response message 1720 may be sent to the client in the depicted embodiment to acknowledge the submission of the menu contents. In some embodiments, other customization data may also or instead be provided by the client (such as examples of orders received at the restaurant) and used to adapt the models for the premise.

A workload distribution policy for determining where (e.g., at the restaurant premise, at the provider network, or at customer devices) various types of machine learning tasks are to be conducted for conversational orders directed to the restaurant premise may be indicated by the client via a WorkLoadDistributionPolicy message 1723 in the depicted embodiment. A policy similar to those discussed in the context of FIG. 16 may be indicated in some embodiments. The policy may be saved at the AROMS 1712, and a WDPolicySaved message 1725 may be sent to the client in the depicted embodiment. In some embodiments, a client may use respective programmatic interactions to specify individual workload distribution rules to be enforced as part of the policy—e.g., after an initial policy comprising some number of rules is selected, the client may modify some of the rules, indicate new rules, delete some rules, etc.

A policy to be used to determine the conditions under which an escalation action is to be initiated with respect to a conversational interaction, and the details of the escalation action (e.g., how a restaurant employee is to be notified to intervene in the interaction, what information about the in-progress conversation is to be presented to the employee, etc.) may be indicated by a client in an EscalationPolicy message 1731 in some embodiments. The escalation-related information may be stored at the AROMS 1712, and an EscalationPolicySaved messages 1734 may be sent back to the client in at least one embodiment.

A customization policy, indicating for example promotional offers or discounts to be offered to potential customers under specified conditions, regulation-based information to be presented to customers, actions to be taken in response to detecting an anomaly with respect to one or more customer utterances, etc., may be indicated by a client 1710 via a DialogCustomizationPolicy message 1737 in some embodiments. The dialog customization policy may be stored at the AROMS 1712, and a DialogCustomizationPolicySaved message 1739 may be sent to the client in the depicted embodiment.

A client 1710 may submit a request to retrain at least some of the machine learning models being used for the restaurant, e.g., via a RetrainModels request 1741 in the depicted embodiment. In at least some embodiments, changes to the menu may be indicated in the retraining request, and such changes may be used at the AROMS to construct new training examples which can be used to retrain the models. After the retraining is complete, in some embodiments a ModelsRetrained message 1743 may be sent to the client from the AROMS.

In some embodiments, a client 1710 may submit a request to the AROMS to debug the functionality of on-premise devices/programs, and/or to check on the connectivity between the components of the on-premise network being used for order processing, e.g., in the form of a DebugRestaurantPremiseComponents request 1745. In response, a set of debugging operations may be initiated, e.g., using a system administrator or debugging agent similar to agent 1405 of FIG. 14. Log messages transmitted from the restaurant premise to the provider network components of the AROMS, e.g., by a logging/monitoring manager 1406 may be used for the debugging in some implementations. A DebuggingResults message 1747 may be sent to the client to provide results of the debugging tasks (and any actions initiated based on the debugging, such as restarting an on-premise order coordinator, reestablishing connectivity among devices of the on-premise network, etc.) in the depicted embodiment.

According to one embodiment, a client may submit a GetOrderManagementMetrics request 1751 to the AROMS to obtain metrics of tasks conducted at the AROMS for the orders directed to the registered restaurant. One or more types of metrics pertaining specifically to the restaurant's order processing may be provided in a MetricSet response message 1753 in the depicted embodiment. Such metrics may include, for example, the number of utterances/conversations analyzed in a specified time interval, the number of escalations requiring employee intervention, measures of CPU/GPU utilization at resources of the provider network or the premise, measures of network traffic between the provider network and the restaurant premise, and so on.

In some embodiments, as mentioned earlier, the AROMS may be able to analyze acoustic quality (or other sensor-collected information) captured in user interactions at the restaurant premise, and recommend changes to the positioning or placement of devices such as microphones, speakers and the like at the premise. A GetPlacementRecommendations request 1755 may be submitted by a client via programmatic interfaces 1777 in some embodiments. In response, one or more recommendations may be sent back to client in a PlacementRecommendationSet message 1757 in the depicted embodiment. Note that in some cases, the AROMS may not necessarily recommend any changes to the current configuration of the devices at the restaurant premise. Other types of programmatic interactions pertaining to automated restaurant order processing may be supported by an AROMS in some embodiments than those shown in FIG. 17.

Methods for Automated Restaurant Order Processing

Figure 18:
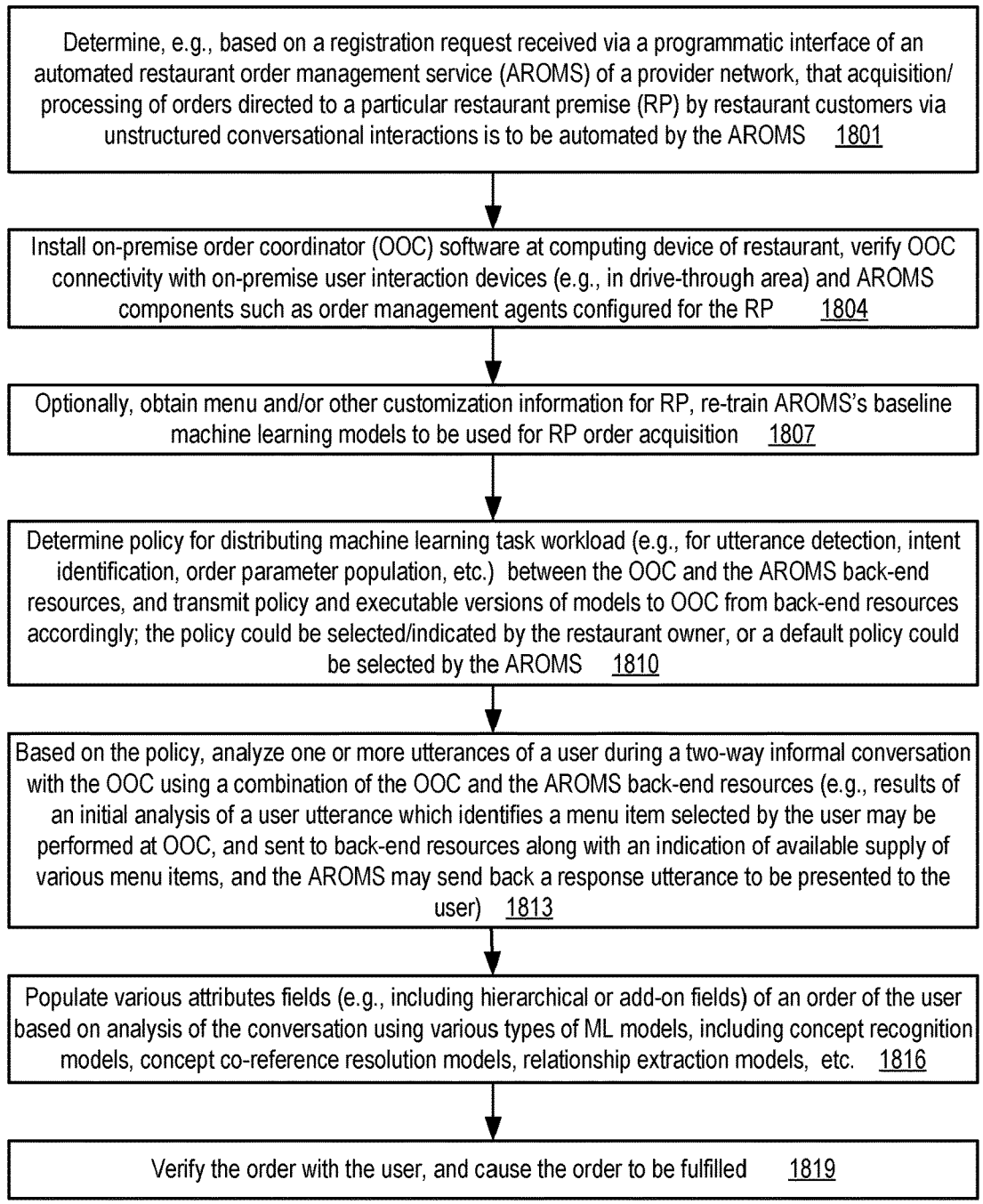
FIG. 18 is a flow diagram illustrating aspects of operations that may be performed for dialog-driven restaurant order management, according to at least some embodiments.

FIG. 18 is a flow diagram illustrating aspects of operations that may be performed for dialog-driven restaurant order management, according to at least some embodiments. As shown in element 1801, a determination may be made, e.g., based on a registration request received via a programmatic interface of an automated restaurant order management service (AROMS) of a provider network similar in functionality to AROMS 1204 of FIG. 12, that acquisition/processing of orders directed to a particular restaurant premise (RP) by restaurant customers via unstructured conversational interactions is to be automated by the AROMS in the depicted embodiment.

One or more software programs of the AROMS, e.g., including an on-premise order coordinator (OOC) may be automatically installed and launched at one or more computing devices of the restaurant premise after the premise is registered, e.g., based on information provided by the restaurant owner regarding the computing capacity available at the premise in some embodiments (element 1804). OOC connectivity with on-premise user interaction devices (e.g., microphones, speakers, touch screens etc. in a drive-through area or lane of the restaurant) and AROMS components such as order management agents configured for the RP may be verified by the back end components of the AROMS running at the provider network's data centers in various embodiments.

Optionally, in at least some embodiments, customization data for the RP, including for example menu items specific to the RP, may be provided by the AROMS client on whose behalf the RP was registered. Such customization data sets may be used, for example, to generate training examples for re-training at least some machine learning models of the AROMS which are to be used for order acquisition for the RP (element 1807).

A policy for distributing machine learning task workload (e.g., for utterance detection, hierarchical concept recognition, relationship extraction, co-reference resolution, etc.) for order acquisition/analysis between respective sets of models run at the OOC and the AROMS back-end resources may be determined (element 1810) in various embodiments. The policy could be selected/indicated by the RP owner/manager, or a default policy could be selected by the AROMS. The policy and executable versions of one or more models may be sent to the OOC from the back-end resources accordingly. As a result, the OOC may be able to determine, for a given user's interactions, which machine learning tasks should be conducted at the RP, and which should be conducted at the back-end resources of the provider network. In effect, the OOC may orchestrate the use of a first set of machine learning models for a first set of tasks associated with various types of user interactions at the RP based on the policy, and transmit requests for the remaining machine learning tasks to the back end resources in various embodiments.

Based on the policy, one or more utterances of a given user or customer of the restaurant during a two-way informal conversation with the OOC may be analyzed using a combination of the OOC and the AROMS back-end resources in various embodiments (element 1813). For example, results of an initial analysis of a user utterance, which identifies a menu item selected by the user may be performed at an OOC, and sent to back-end resources along with an indication of available supply of various menu items, and the AROMS may send back a response utterance (composed with the help of one or more models) to be presented to the user. In some cases, the menu item may be identified at the back-end components of the AROMS, and the back-end components could send an indication of the menu item back to the OOC, which could then send information about the availability of the menu item to the AROMS back-end, where the response utterance could be prepared.

Various attributes/fields (e.g., including hierarchical or add-on fields) of an order of the user may be populated based on analysis of the conversation using various types of ML models, including concept recognition models, concept co-reference resolution models, relationship extraction models, etc. in the depicted embodiment (element 1816). Contents of the order may be verified with the user by the OOC in some embodiments, and the order may be fulfilled at the RP (element 1819).

It is noted that in various embodiments, some of the operations shown in FIG. 11 or FIG. 18 may be implemented in a different order than that shown in the figure, or may be performed in parallel rather than sequentially. Additionally, some of the operations shown in FIG. 11 or in FIG. 18 may not be required in one or more implementations.

Example Provider Network Environment

Figure 19:
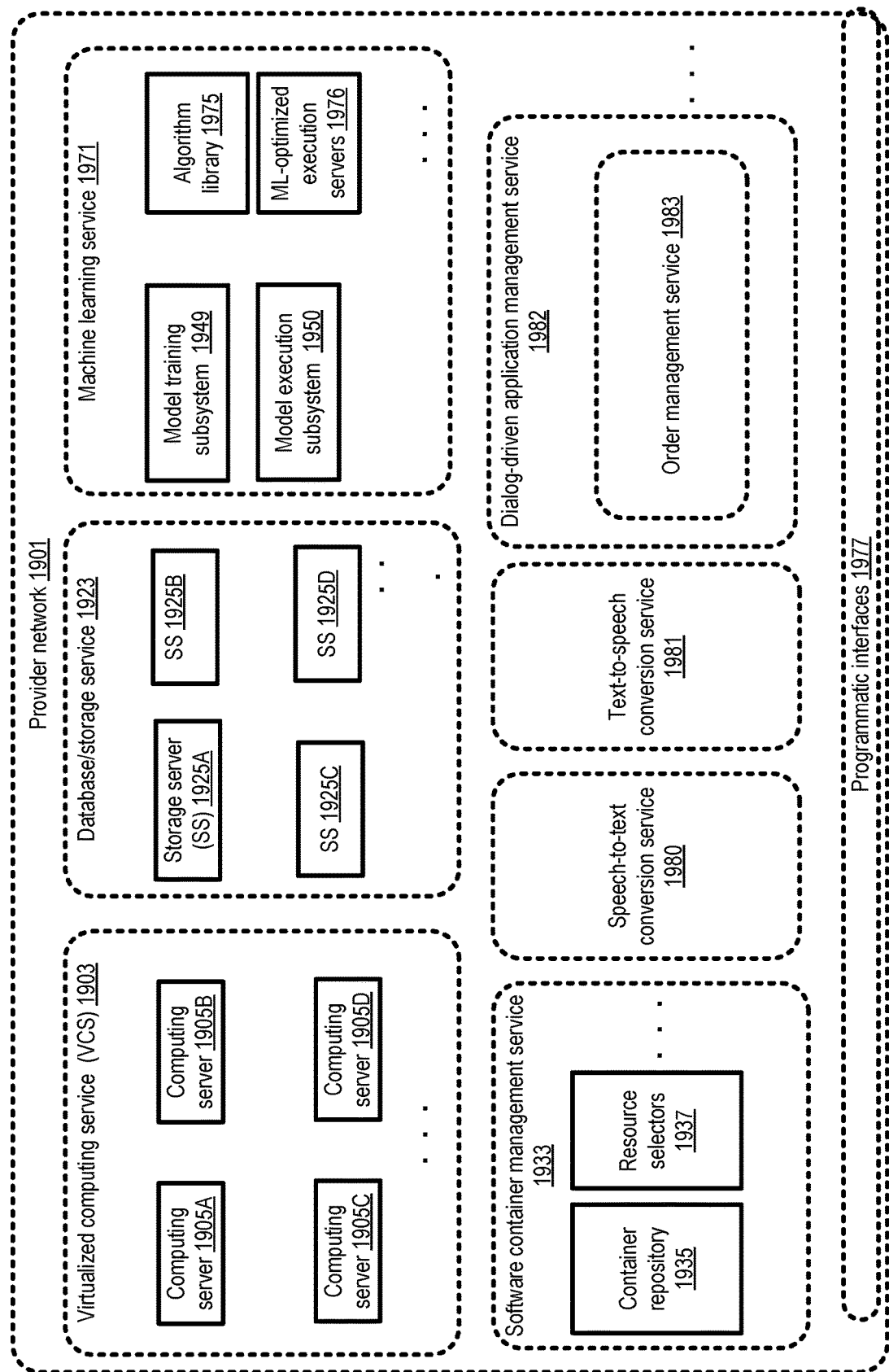
FIG. 19 illustrates an example provider network environment at which a one or more services for dialog-driven order management may be implemented, according to at least some embodiments.

FIG. 19 illustrates an example provider network environment at which a one or more services for dialog-driven order management may be implemented, according to at least some embodiments. In the depicted embodiment, provider network 1901 may comprise resources used to implement a plurality of services, including for example a virtualized computing service (VCS) 1903, a database/storage service 1923, a software container management service 1933, a machine learning service 1971, a speech-to-text conversion service 1980, a text-to-speech conversion service 1981, and a dialog-driven application management service (DAMS) 1982 within which an order management service 1983 similar to DOMS 102 of FIG. 1 and/or AROMS 1204 of FIG. 12 may be implemented.

The machine learning service 1971, which may also be referred to as an analytics service or an artificial intelligence service, may comprise algorithm library 1975, model training subsystem 1949 at which various types of models (including models of the type indicated in FIG. 3 or FIG. 15 may be trained and re-trained using algorithms from library 1975, model execution subsystem 1950 at which the models can be executed if desired, as well as a set of machine learning-optimized execution servers 1976 (e.g., servers comprising chipsets developed specifically for ML tasks) in the depicted embodiment. The DAMS 1982 may provide tools (similar to order acquisition application building tools 120 of FIG. 1) enabling clients to easily develop dialog-driven applications for various problem domains in the depicted embodiment, e.g., without providing source code for the applications. Order management service 1983 may be implemented as a subcomponent of the more general DAMS 1982 in some embodiments; in other embodiments, the order management service may be implemented as an independent service instead of as a DAMS subcomponent. The order management service 1983 may utilize the machine learning service 1971, speech-to-text conversion service 1980, and/or text-to-speech conversion service 1981 in the depicted embodiment to accomplish various machine learning tasks associated with order acquisition and processing. Software container management service 1933 may comprise a container repository 1935 and resource selectors 1937 which dynamically acquire computing resources (e.g., from VCS 1903) to execute software containers which may be used for various types of machine learning tasks for order acquisition in some embodiments.

As suggested above, components of a given service may utilize components of other services in the depicted embodiment—e.g., for some machine learning service tasks, virtual machines implemented at computing servers such as 1905A-1905D of the virtualized computing service 1903 may be used, example input data, metrics and/or output produced at the machine learning service may be stored at storage servers 1925 (e.g., 1925A-1925D) of storage service 1923, and so on. Individual ones of the services shown in FIG. 19 may implement a respective set of programmatic interfaces 1977 which can be used by external and/or internal clients (where the internal clients may comprise components of other services) in the depicted embodiment.

Illustrative Computer System

Figure 20:
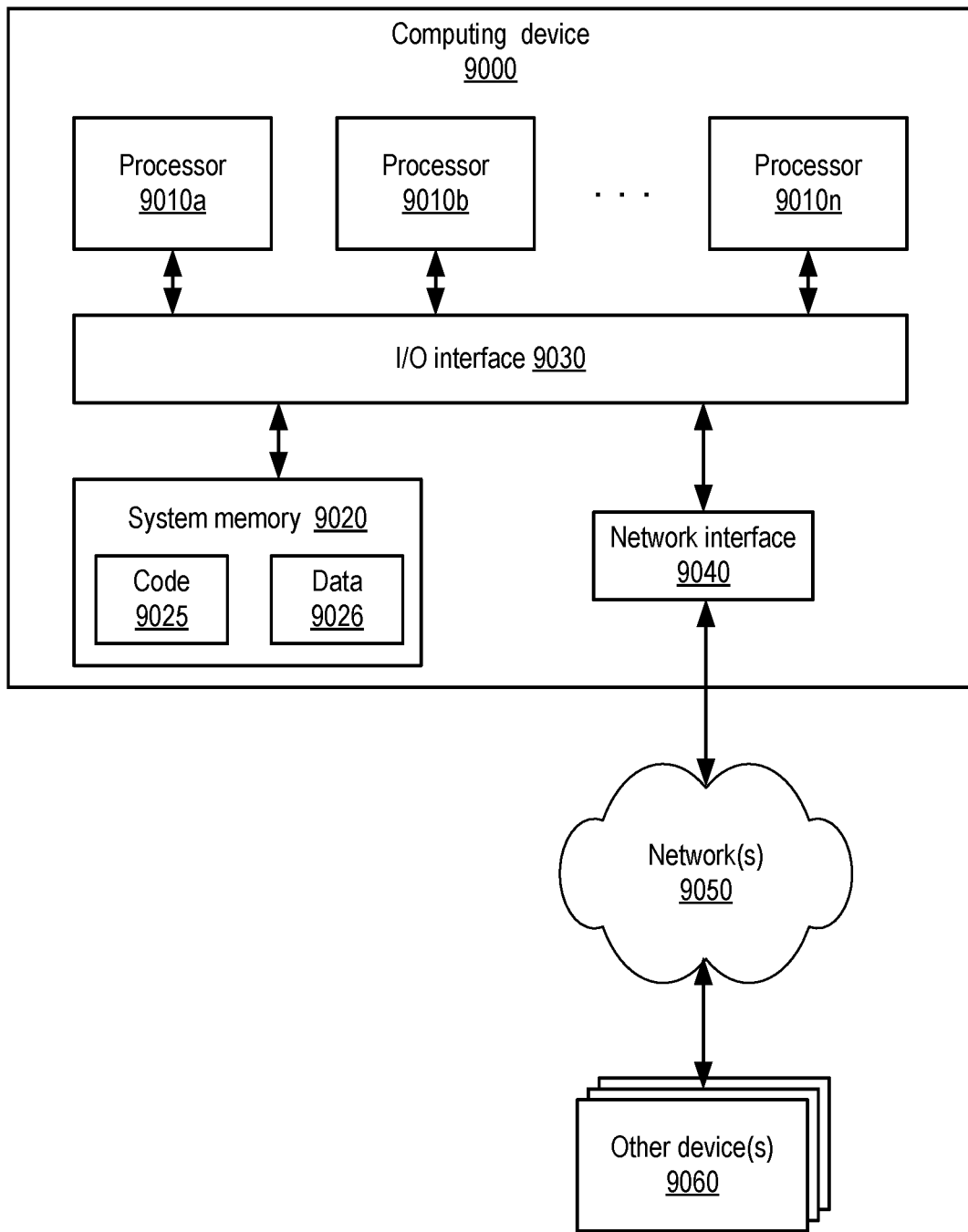
FIG. 20 is a block diagram illustrating an example computing device that may be used in at least some embodiments.

In at least some embodiments, a server that implements the types of techniques described herein (e.g., various functions of a dialog-driven order management service, an automated restaurant order management service, on-premise order coordinators and the like), may include a general-purpose computer system that includes or is configured to access one or more computer-accessible media. FIG. 20 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 19, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 19. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 20 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. One or more non-transitory computer-accessible storage media storing program instructions that when executed on or across one or more processors cause the one or more processors to:
   execute a first set of one or more machine learning models to process at least a portion of a first communication from a first user of a first restaurant at an order coordinator external to a provider network to generate a graph indicating a plurality of concepts associated with an order detected in the first communication and relationships among the concepts, wherein the execution of the first set of one or more machine learning models resolves co-references of the concepts in the first communication to reduce a number of concepts in the graph;
   send, over one or more network connections, the graph of the concepts detected in the first communication to one or more resources of an order management service implemented at least in part at the provider network;
   receive, over the one or more network connections, a response to the first communication from the order management service, wherein the response is to be presented to the first user by an interaction device, wherein at least a portion of the response is prepared by the order management service via execution of a second set of one or more machine learning models, wherein the response includes an item list of the order populated based at least in part on the first communication; and
   cause, by the order coordinator, the order of the first user to be fulfilled based at least in part on analysis of a second communication of the first user, wherein the second communication is detected after the response is presented to the first user.

2. The one or more non-transitory computer-accessible storage media as recited in claim 1, wherein the interaction device comprises one or more of: (a) a speaker, (b) a display, (c) a phone, (d) a portable computing device, (e) a wearable device or (f) a voice-driven personal assistant device.

3. The one or more non-transitory computer-accessible storage media as recited in claim 1, storing further program instructions that when executed on or across one or more processors further cause the one or more processors to:
   determine, at the order coordinator, that a vehicle in a drive-through area of the first restaurant has been detected by one or more sensors; and
   activate, by the order coordinator, a machine learning model of the first set of one or more machine learning models in response to detection of the vehicle.

4. The one or more non-transitory computer-accessible storage media as recited in claim 1, storing further program instructions that when executed on or across one or more processors further cause the one or more processors to:
   identify, using a customer recognition model, the first user as a repeat customer of the first restaurant, wherein a presence of the first user is detected using a customer presence detection model; and
   proactively populate one or more parameters of the order of the first user based at least in part on identification of the first user as a repeat customer.

5. The one or more non-transitory computer-accessible storage media as recited in claim 4, wherein at least one workload distribution rule of the one or more workload distribution rules is obtained via a programmatic interface from a client of the order management service.

6. A computer-implemented method, comprising:
   executing a first set of one or more machine learning models to process at least a portion of a first communication from a first user of a first restaurant at an order coordinator external to a provider network to generate a graph indicating a plurality of concepts associated with an order detected in the first communication and relationships among the concepts, wherein the execution of the first set of one or more machine learning models resolves co-references of the concepts in the first communication to reduce a number of concepts in the graph;
   sending, over one or more network connections, the graph of the concepts detected in the first communication to one or more resources of an order management service implemented at least in part at the provider network;
   receiving, over the one or more network connections, a response to the first communication from the order management service, wherein the response is to be presented to the first user, wherein at least a portion of the response is prepared by the order management service via execution of a second set of one or more machine learning models, wherein the response includes an item list of the order populated based at least in part on the first communication; and
   causing, by the order coordinator, the order of the first user to be fulfilled based at least in part on analysis of a second communication of the first user, wherein the second communication is detected after the response is presented to the first user.

7. The computer-implemented method as recited in claim 6, further comprising:
   obtaining, at the order coordinator, one or more workload distribution rules associated with the first restaurant which indicate (a) a first set of machine learning tasks to be performed using the first set of one or more machine learning models with respect to interactions with one or more users of the first restaurant and (b) a second set of machine learning tasks to be performed using the second set of one or more machine learning models with respect to interactions with the one or more users;

causing, by the order coordinator, the first set of machine learning tasks to be performed using the first set of one or more machine learning models; and transmitting, by the order coordinator, one or more requests for the second set of machine learning tasks to one or more resources of the provider network.

8. The computer-implemented method as recited in claim 7, further comprising:

obtaining, at the order management service from a client via one or more programmatic interfaces, at least one rule of the one or more workload distribution rules.

9. The computer-implemented method as recited in claim 7, wherein a first workload distribution rule of the one or more workload distribution rules indicates that a communication mode utilized for a particular communication by a user is be used to select, from the first set of one or more machine learning models and the second set of one or more machine learning models, a particular set of one or more machine learning models to be used to perform a particular machine learning task with respect to the particular communication, wherein the communication mode comprises one or more of: (a) a voice mode or (b) a text mode.

10. The computer-implemented method as recited in claim 7, wherein a first workload distribution rule of the one or more workload distribution rules indicates a performance criterion to be used to select, from the first set of one or more machine learning models and the second set of one or more machine learning models, a particular set of one or more machine learning models to be used to perform a particular machine learning task with respect to interactions with one or more users of the first restaurant.

11. The computer-implemented method as recited in claim 10, wherein the performance criterion comprises one or more of (a) a latency criterion with respect to communications between the order coordinator and the provider network, or (b) a resource utilization metric of one or more computing devices located at the restaurant that execute the order coordinator.

12. The computer-implemented method as recited in claim 6, further comprising:

obtaining, by the order coordinator, results obtained from a sentiment analysis of one or more detected utterances of the first user, wherein the sentiment analysis is performed using at least one machine learning model of the first set of one or more machine learning models or the second set of one or more machine learning models; and initiating, by the order coordinator, an escalation action with respect to the first user based at least in part on the results obtained from the sentiment analysis.

13. The computer-implemented method as recited in claim 6, wherein at least a portion of the order coordinator is implemented at one or more of: (a) a phone, (b) a voice-driven personal assistant device, (c) a tablet, (d) a laptop, (e) a desktop, or (f) an IoT (Internet of Things) devices.

14. The computer-implemented method as recited in claim 6, wherein a machine learning model of the first set of one or more machine learning models or the second set of one or more machine learning models comprises one or more of: (a) an utterance initiation detection model, (b) an utterance completion detection model, (c) a speech-to-text conversion model, (d) an intent classification model, (e) a sentiment analysis model, (f) a text-to-speech conversion model, (g) a concept recognition model trained to recognize, within user communications, primary concepts representing restaurant menu items and auxiliary concepts which do not represent restaurant menu items of the restaurant, wherein the auxiliary concepts are usable to populate one or more properties of restaurant orders, (h) an entity resolution model, or (i) a contextual interpretation model.

15. The computer-implemented method as recited in claim 6, further comprising:

receiving, from the order management service, a recommendation for physical placement of one or more interaction devices accessible by users of the first restaurant, wherein the recommendation is generated via execution of the second set of one or more machine learning models.

16. A system, comprising:

one or more computing devices including instructions that upon execution on or across the one or more computing devices cause the one or more computing devices to:

execute a first set of one or more machine learning models to process at least a portion of a first communication from a first user of a first restaurant at an order coordinator external to a provider network to generate a graph indicating a plurality of concepts associated with an order detected the first communication and relationships among the concepts, wherein the execution of the first set of one or more machine learning models resolves co-references of the concepts in the first communication to reduce a number of concepts in the graph;

send, over one or more network connections, the graph of the concepts detected in the first communication to one or more resources of an order management service implemented at least in part at the provider network;

receive, over the one or more network connections, a response to the first communication from the order management service, wherein the response is to be presented to the first user by an interaction device, wherein at least a portion of the response is prepared by the order management service via execution of a second set of one or more machine learning models, wherein the response includes an item list of the order populated based at least in part on the processing of the first communication; and cause, by the order coordinator, the order of the first user to be fulfilled based at least in part on analysis of a second communication of the first user, wherein the second communication is detected after the response is presented to the first user.

17. The system as recited in claim 16, wherein the one or more computing devices include further instructions that upon execution on or across the one or more computing devices further cause the one or more computing devices to:

obtain a customization data set pertaining to the first restaurant via one or more programmatic interfaces; and train at least one machine learning model of the first set of one or more machine learning models using the customization data set.

18. The system as recited in claim 16, wherein the one or more computing devices include further instructions that upon execution on or across the one or more computing devices further cause the one or more computing devices to:

in response to a detection that an escalation criterion has been met, cause an in-person interaction to be initiated with the first user, wherein the escalation criterion is evaluated using at least one machine learning model of the first set of one or more machine learning models or the second set of one or more machine learning models.

19. The system as recited in claim 16, wherein the one or more computing devices include further instructions that upon execution on or across the one or more computing devices further cause the one or more computing devices to:
   determine, in accordance with a dialog customization policy obtained for the first restaurant, contents of at least a portion of a particular response utterance presented to the first user, wherein the dialog customization policy indicates one or more of: (a) a discount offer, (b) information to be presented in accordance with a regulation, or (c) a message to be presented in response to a detection of an anomaly in one or more user utterances.

20. The system as recited in claim 16, wherein the one or more computing devices include further instructions that upon execution on or across the one or more computing devices further cause the one or more computing devices to:
   send, to the order management service, policy data to automate order acquisition for the first restaurant, wherein the policy data is used to generate a policy for distributing a plurality of categories of machine learning tasks pertaining to restaurant orders among (a) the on-premise order coordinator executed at the first restaurant and (b) a first back-end resource of the one or more resources of the order management service, wherein the first back-end resource is implemented at the provider network, and wherein the plurality of categories include user utterance detection, restaurant menu item identification, relationship extraction, and co-reference resolution; and
   send, by the on-premise order coordinator to the first back-end resource, at least an indication of an available supply of a restaurant menu item at the first restaurant, wherein the restaurant menu item is identified from one or more utterances including an utterance of the first communication.

* * * * *